(12) United States Patent
Sugano

(10) Patent No.: US 12,366,181 B2
(45) Date of Patent: Jul. 22, 2025

(54) FLUID CONTROL VALVE UNIT AND VALVE TIMING CHANGING DEVICE

(71) Applicant: MIKUNI CORPORATION, Tokyo (JP)

(72) Inventor: Kouji Sugano, Kanagawa (JP)

(73) Assignee: MIKUNI CORPORATION, Tokyo (JP)

( * ) Notice: Subject to any disclaimer, the term of this patent is extended or adjusted under 35 U.S.C. 154(b) by 218 days.

(21) Appl. No.: 18/164,567

(22) Filed: Feb. 4, 2023

(65) Prior Publication Data

US 2023/0340897 A1  Oct. 26, 2023

(30) Foreign Application Priority Data

Apr. 21, 2022  (JP) .................. 2022-070158

(51) Int. Cl.
*F01L 1/344* (2006.01)
*F16K 11/07* (2006.01)

(52) U.S. Cl.
CPC ........ *F01L 1/3442* (2013.01); *F16K 11/0712* (2013.01); *F01L 2001/34426* (2013.01); *F01L 2001/3444* (2013.01); *F01L 2303/00* (2020.05)

(58) Field of Classification Search
CPC ......................... F01L 1/3442; F01L 2001/3444
See application file for complete search history.

(56) References Cited

U.S. PATENT DOCUMENTS

| 6,332,441 | B1 * | 12/2001 | Sugiyama | F01L 1/02 123/90.31 |
| 9,863,290 | B2 * | 1/2018 | Mitsutani | F01L 1/024 |
| 2007/0095315 | A1 * | 5/2007 | Hoppe | F01L 1/34 123/90.17 |
| 2017/0022854 | A1 * | 1/2017 | Takada | F01L 1/047 |

FOREIGN PATENT DOCUMENTS

JP  2015124643  7/2015

* cited by examiner

*Primary Examiner* — Kenneth Rinehart
*Assistant Examiner* — Nicole Gardner
(74) *Attorney, Agent, or Firm* — JCIPRNET

(57) ABSTRACT

A fluid control valve unit includes: a fluid control valve including a sleeve that defines an axis and a spool slidably disposed in the sleeve; a passage member including an inner peripheral surface to which the sleeve is fitted, passages, an annular receiving part facing one end of the sleeve, an opening adjacent to the annular receiving part, and an annular groove formed adjacent to the other end of the sleeve and recessed from the inner peripheral surface; a filter member including an elastic part sandwiched between the one end of the sleeve and the annular receiving part and exerting a biasing force in the axial direction; and a snap ring fitted in the annular groove for receiving the other end of the sleeve and detachably receiving the spool.

16 Claims, 30 Drawing Sheets

FLUID CONTROL VALVE UNIT AND VALVE TIMING CHANGING DEVICE

CROSS-REFERENCE TO RELATED APPLICATION

This application claims the priority benefit of Japan application serial no. 2022-070158, filed on Apr. 21, 2022. The entirety of the above-mentioned patent application is hereby incorporated by reference herein and made a part of this specification.

BACKGROUND

Technical Field

The disclosure relates to a fluid control valve unit and a valve timing changing device for an internal combustion engine using the fluid control valve unit.

Description of Related Art

A hydraulic control valve is known as a conventional fluid control valve unit, which includes a valve body having an insertion hole centered on an axis, a bottomed cylindrical sleeve closely inserted into the valve body, a spool valve body slidably disposed in the sleeve, a valve spring disposed within the sleeve to axially bias the spool valve body, a check valve disposed between a tip (bottom wall) of the valve body and one end of the sleeve, a fixing member that contacts the other end of the sleeve, and an elastic member (a sealing member that forms an O-ring) disposed between the end of the check valve and the bottom wall of the valve body. (See, for example, Patent Literature 1).

In this hydraulic control valve, the check valve includes a cylindrical body, a ball valve body disposed to be axially movable in the body, a coil spring that biases the ball valve body in the valve closing direction, and a filter member crimped and fixed to the body.

The sleeve has a structure in which one end of the sleeve in the axial direction is held by a sealing member that exerts an elastic force and is disposed between the tip (bottom wall) of the valve body and the body of the check valve, and the other end of the sleeve in the axial direction is held by an annular fixing member press-fitted into the inner wall surface of the valve body.

Here, since the fixing member that holds the other end of the sleeve is fixed to the inner wall surface of the valve body by press-fitting, there is a risk that the fixing member may come off due to the impact caused by the reciprocating movement of the spool valve body or changes over time. In addition, the sealing member exerting a biasing force on one end of the sleeve has a structure that exerts a biasing force through the body of the check valve, and the filter member has a structure that is crimped and fixed to the body; therefore, the structure is complicated, and the assembly work is complicated.

RELATED ART

Patent Literature

[Patent Literature 1] Japanese Patent Application Laid-Open No. 2015-124643

SUMMARY

Technical Problem

The disclosure has been made in view of the above circumstances, and the disclosure provides a fluid control valve unit and a valve timing changing device using the fluid control valve unit capable of simplifying the structure, reducing the number of parts, simplifying the assembly work, preventing foreign matter from entering, and holding the sleeve at a predetermined position to ensure functional reliability.

Solution to Problem

A fluid control valve unit according to the disclosure includes: a fluid control valve including a sleeve in a bottomed cylindrical shape that defines an axis and has an inlet for fluid and a communication port communicating with outside for fluid to pass through, and a spool slidably disposed in the sleeve for opening and closing the communication port; a cylindrical passage member including an inner peripheral surface to which the sleeve is fitted, a passage for fluid leading to the communication port, an annular receiving part facing one end of the sleeve in a direction of the axis, an opening formed adjacent to the annular receiving part and allowing fluid to flow in, and an annular groove formed adjacent to an other end of the sleeve in the direction of the axis and recessed from the inner peripheral surface; a filter member including an elastic part sandwiched between the one end of the sleeve and the annular receiving part of the passage member and exerting a biasing force in the direction of the axis; and a snap ring fitted in the annular groove for receiving the other end of the sleeve accommodated in the passage member and detachably receiving the spool.

The above-described fluid control valve unit may adopt a configuration in which the filter member includes an annular part facing the annular receiving part of the passage member and the one end of the sleeve in the direction of the axis, a filter part provided inside the annular part, and the elastic part provided on the annular part.

The above-described fluid control valve unit may adopt a configuration in which the elastic part is provided on two end surfaces of the annular part in the direction of the axis.

The above-described fluid control valve unit may adopt a configuration in which the elastic part is provided on an end surface of the annular part facing the annular receiving part of the passage member in the direction of the axis.

The above-described fluid control valve unit may adopt a configuration in which the sleeve includes a thinned passage formed in an outer wall for supplying fluid that has passed through the filter member to the inlet, and the one end of the sleeve and the annular receiving part of the passage member position and hold the filter member in a region facing the thinned passage.

The above-described fluid control valve unit may adopt a configuration in which the elastic part is provided on two end surfaces of the annular part in the direction of the axis.

The above-described fluid control valve unit may adopt a configuration in which the elastic part is provided on an end surface of the annular part facing the annular receiving part of the passage member in the direction of the axis.

The above-described fluid control valve unit may adopt a configuration in which the fluid control valve includes a check valve disposed inside the sleeve to allow fluid to flow in from the inlet.

The above-described fluid control valve unit may adopt a configuration in which the snap ring includes a discharge port capable of discharging fluid flowing through a discharge passage formed in the passage member.

The above-described fluid control valve unit may adopt a configuration in which the snap ring is formed in a flat plate shape extending in a direction perpendicular to the axis.

The above-described fluid control valve unit may adopt a configuration in which the sleeve includes, as the communication port, a first communication port and a second communication port located on two sides of the inlet in the direction of the axis, and the spool includes a rod that reciprocates within the sleeve, a first valve that is provided on the rod to open and close a passage between the inlet and the first communication port, a second valve that is provided on the rod to open and close a passage between the inlet and the second communication port, and a biasing spring that exerts a biasing force in a direction to bring the first valve into contact with the snap ring.

The above-described fluid control valve unit may adopt a configuration in which the spool includes a compression spring disposed between the first valve and the second valve; the first valve includes a first fixed part fixed to the rod and having a first land capable of closing the first communication port and a first internal passage formed inside the first land, and a first movable part movably supported along the rod and having a first lid part for opening and closing the first internal passage; the second valve includes a second fixed part fixed to the rod and having a second land capable of closing the second communication port and a second internal passage formed inside the second land, and a second movable part movably supported along the rod and having a second lid part for opening and closing the second internal passage; and the compression spring is disposed to exert a biasing force to close the first lid part and to close the second lid part.

A valve timing changing device according to the disclosure is a valve timing changing device for changing opening and closing timing of an intake valve or an exhaust valve driven by a camshaft, and the valve timing changing device includes: a housing rotor that rotates coaxially with the camshaft; a vane rotor that defines an advance chamber and a retard chamber together with the housing rotor and that rotates integrally with the camshaft; and a fluid control valve unit as described above for controlling supply and discharge of hydraulic oil with respect to the advance chamber and the retard chamber, and the fluid control valve unit includes a sleeve having an inlet, a first communication port and a second communication port, and a spool having a first valve and a second valve. The inlet of the fluid control valve unit is a supply port to which hydraulic oil is supplied. The first communication port of the fluid control valve unit is a retard port that communicates with the retard chamber. The second communication port of the fluid control valve unit is an advance port that communicates with the advance chamber.

The above-described valve timing changing device may adopt a configuration which further includes a fastening bolt that fastens the vane rotor to the camshaft, and the fastening bolt is the passage member of the fluid control valve unit.

The above-described valve timing changing device may adopt a configuration in which the fluid control valve of the fluid control valve unit is a torque-driven and hydraulically-driven fluid control valve capable of reciprocating hydraulic oil between the retard chamber and the advance chamber by a fluctuating torque received by the camshaft and discharging a part of the supplied hydraulic oil.

The above-described valve timing changing device may adopt a configuration in which the spool is formed so that in a state where the spool is positioned in a retard mode in which the first valve is opened and the second valve is closed, when the camshaft receives a reverse torque, the second valve opens to allow hydraulic oil to flow from the advance port to the retard port, and in a state where the spool is positioned in an advance mode in which the first valve is closed and the second valve is opened, when the camshaft receives a forward torque, the first valve opens to allow hydraulic oil to flow from the retard port to the advance port.

The above-described valve timing changing device may adopt a configuration in which the spool is formed to block reciprocation of hydraulic oil between the retard chamber and the advance chamber in a state of being positioned in a neutral holding mode in which the first valve closes the retard port and the second valve closes the advance port.

Effects

According to the fluid control valve unit according with the above configurations, it is possible to simplify the structure, reduce the number of parts, and simplify the assembly work, and it is possible to prevent foreign matter from entering and to hold the sleeve at a predetermined position to ensure functional reliability. Further, according to the valve timing changing device including the fluid control valve unit with the above configurations, it is possible to hold the sleeve at a predetermined position to ensure functional reliability while achieving miniaturization of the device and the like, and it is possible to achieve a desired operation.

DESCRIPTION OF EMBODIMENTS

Hereinafter, embodiments of the disclosure will be described with reference to the accompanying drawings.

Figure 1:
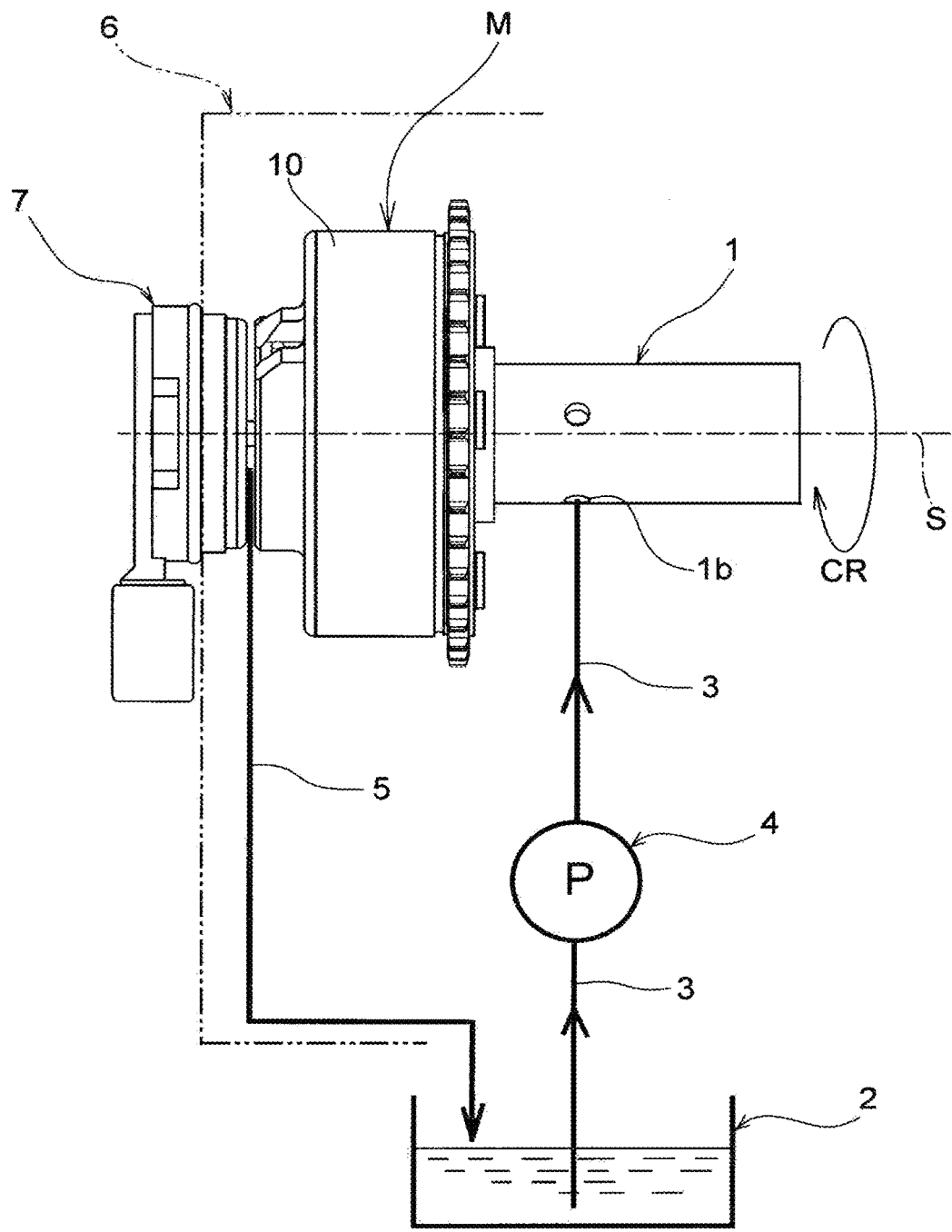
FIG. 1 is a schematic view showing the configuration of an engine to which a valve timing changing device including a fluid control valve unit of the disclosure is applied.
Figure 2:
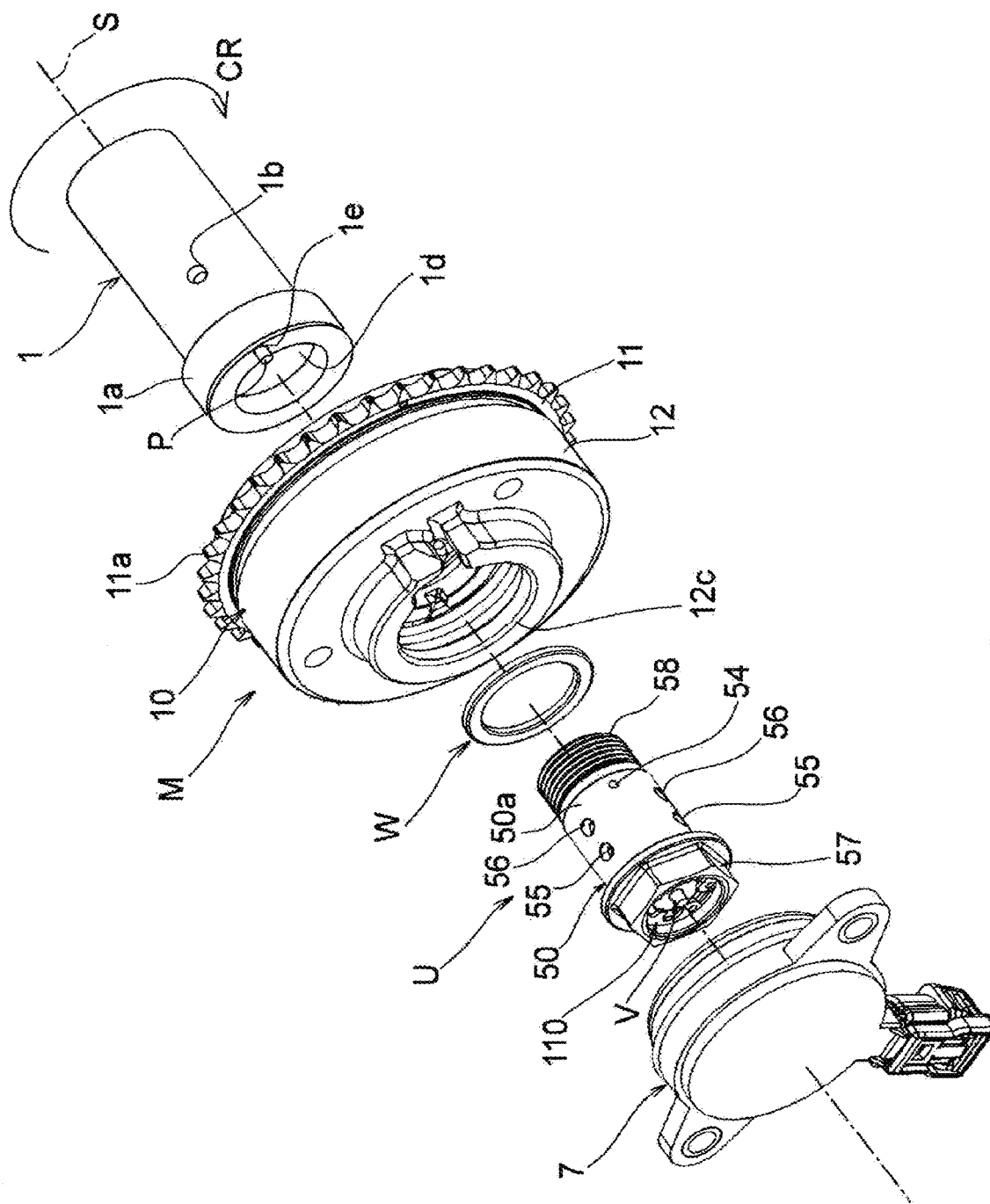
FIG. 2 is an exploded perspective view of the electromagnetic actuator, the fastening bolt with the built-in fluid control valve, the valve timing changing device, and the camshaft in the configuration shown in FIG. 1, as viewed obliquely from the front opposite to the camshaft side.

A valve timing changing device M including a fluid control valve unit according to the disclosure, as shown in FIG. 1, is attached to a camshaft 1 of an internal combustion engine and changes the opening/closing timing, that is, the valve timing, of an intake valve or an exhaust valve driven by the camshaft 1.

The internal combustion engine includes the camshaft 1 that opens and closes an intake valve or an exhaust valve; an oil pan 2 that stores hydraulic oil; a supply passage 3 that supplies the hydraulic oil as a fluid in the oil pan 2 toward the camshaft 1; an oil pump 4 provided in the middle of the supply passage 3 for sucking, pressurizing and discharging the hydraulic oil; a discharge passage 5 that returns hydraulic oil discharged from the fluid control valve unit to the oil pan 2; a chain cover 6 that covers the valve timing changing device M; and an electromagnetic actuator 7 fixed to the chain cover 6.

The camshaft 1, as shown in FIGS. 1 to 7, rotates about an axis S in one direction CR, and includes a fitting shaft 1a, passages 1b and 1c, a female screw part 1d, and a fitting hole 1e into which a positioning pin P is fitted.

The supply passage 3 is formed in the cylinder block, cylinder head, and the like of the internal combustion engine.

The discharge passage 5 is defined between the cylinder block and cylinder head of the internal combustion engine and the chain cover 6 to return excess hydraulic oil discharged from the fluid control valve unit back to the oil pan 2.

Figure 3:
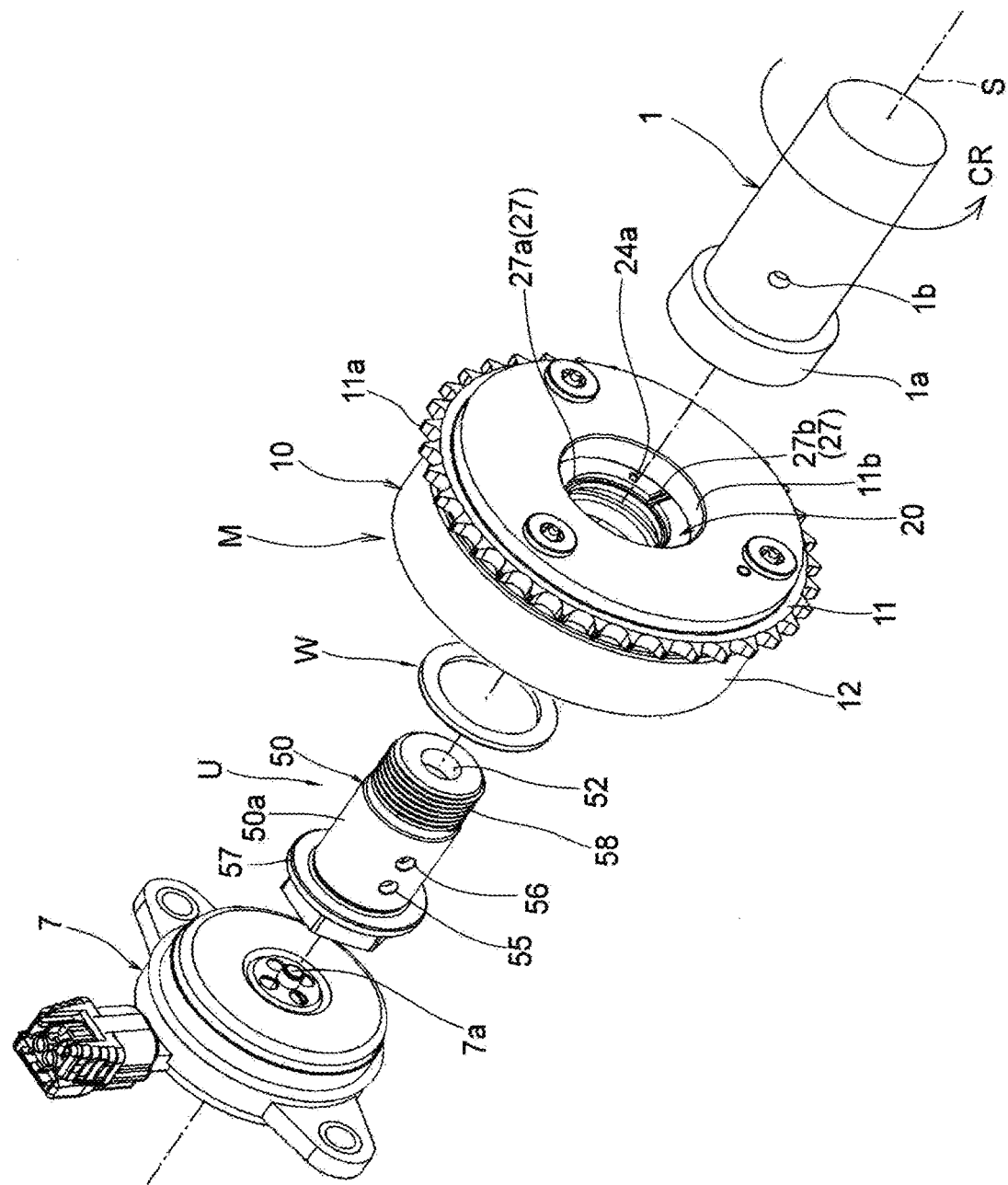
FIG. 3 is an exploded perspective view of the electromagnetic actuator, the fastening bolt with the built-in fluid control valve, the valve timing changing device, and the camshaft in the configuration shown in FIG. 1, as viewed obliquely from the back on the camshaft side.
Figure 4:
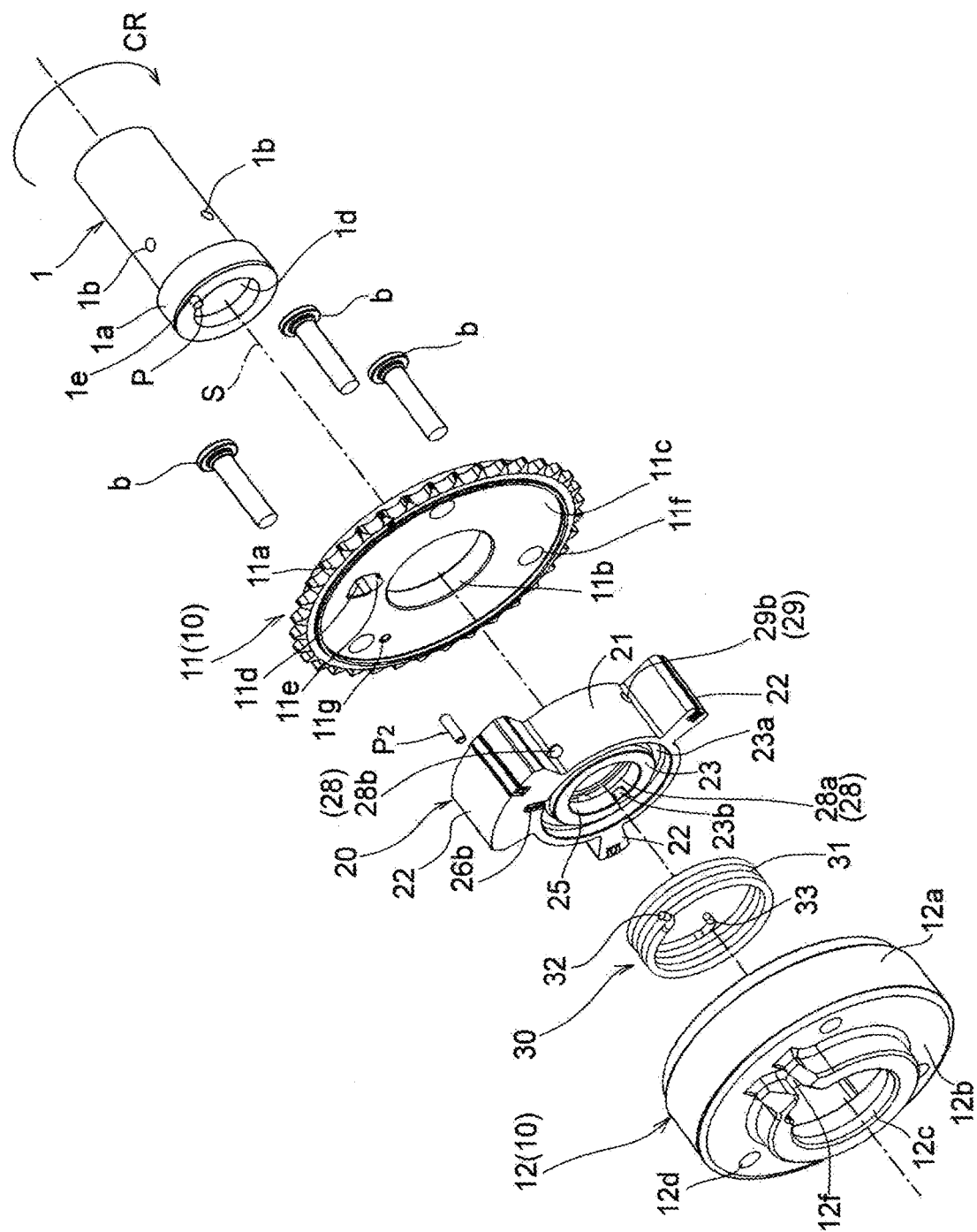
FIG. 4 is an exploded perspective view of the housing rotor, the vane rotor, the rotation biasing spring, and the camshaft included in the valve timing changing device of the disclosure, as viewed obliquely from the front opposite to the camshaft side.

The electromagnetic actuator 7 is fixed to the chain cover 6 and, as shown in FIG. 3, includes a drive shaft 7a that moves in the direction of the axis S and an excitation coil (not shown) that drives the drive shaft 7a.

As shown in FIGS. 2 to 7, the valve timing changing device M includes a housing rotor 10, a vane rotor 20, a rotation biasing spring 30, a lock mechanism 40, and a fluid control valve unit U.

The fluid control valve unit U includes a fastening bolt 50 as a passage member, a filter member 60, a fluid control valve V, and a snap ring 110.

The fluid control valve V switches passages to control the flow of hydraulic oil, and includes a sleeve 70, a spool 80, a biasing spring 90, and a check valve 100.

The housing rotor 10 is rotatably supported on the axis S of the camshaft 1, interlocks with the rotation of the crankshaft via a chain, and transmits the rotational driving force of the crankshaft to the camshaft 1 via the vane rotor 20.

As shown in FIGS. 4 to 7, the housing rotor 10 has a two-piece structure including a disk-shaped first housing 11 and a bottomed cylindrical second housing 12 coupled to the first housing 11. The housing rotor 10 accommodates the vane rotor 20 to be relatively rotatable in the angle range between the most retarded position and the most advanced position, and defines an advance chamber AC and a retard chamber RC together with the vane rotor 20.

The first housing 11 includes a sprocket 11*a*, a fitting hole 11*b*, an inner wall surface 11*c*, a lock hole 11*d*, a recess 11 formed continuously with the lock hole 11*d*, three circular holes 11*f* through which screws b pass, and a positioning hole 11*g* into which a positioning pin P2 is fitted.

The fitting hole 11*b* is rotatably fitted to the fitting shaft 1*a* of the camshaft 1. The inner wall surface 11*c* is in slidable contact with a back surface 24 of the vane rotor 20. A lock pin 41 of the lock mechanism 40 is fitted into the lock hole 11*d* with a small gap. The recess 11*e* is formed around the lock hole 11*d* and guides hydraulic oil to a tip pressure receiving part 41*a* of the lock pin 41 fitted in the lock hole 11*d*.

As shown in FIGS. 4 to 7, the second housing 12 includes a cylindrical wall 12*a*, a front wall 12*b*, an opening 12*c*, three screw holes 12*d* into which screws b are screwed, three shoe parts 12*e*, a hooking groove 12*f*, a recess 12*g*, an annular joint part 12*h* joined to the inner wall surface 11*c* of the first housing 11, and a positioning hole 12*i* into which the positioning pin P2 is fitted.

The opening 12*c* forms a circular hole centered on the axis S through which the fastening bolt 50 is passed.

The three shoe parts 12*e* are formed on the inside of the front wall 12*b* to protrude from the cylindrical wall 12*a* toward the center and are disposed at equal intervals in the circumferential direction.

One shoe part 12*e* contacts the vane 22 of the vane rotor 20 to define the maximum retarded position, and another shoe part 12*e* contacts the vane 22 of the vane rotor 20 to define the maximum advanced position.

The hooking groove 12*f* is formed by cutting out a part of the opening 12*c* to hook a first end 32 of the rotation biasing spring 30. A part of a coil part 31 of the rotation biasing spring 30 is accommodated in the recess 12*g*.

The vane rotor 20 is disposed inside the housing rotor 10, defines the advance chamber AC and the retard chamber RC together with the housing rotor 10, is fixed to the camshaft 1 with the fastening bolt 50 with a washer W therebetween, and rotates integrally with the camshaft 1.

As shown in FIGS. 4 to 7, the vane rotor 20 includes a hub 21, three vanes 22, a front surface 23, an annular recess 23*a*, a hooking groove 23*b*, a back surface 24, a fitting hole 25, a recess 26, a groove passage 27, a retard passage 28, and an advance passage 29.

The vane 22 defines the advance chamber AC and the retard chamber RC together with the shoe part 12*e* of the housing rotor 10. The front surface 23 is disposed in slidable contact with the inner wall surface of the front wall 12*b* of the second housing 12. The annular recess 23*a* is formed by hollowing out the front surface 23 in an annular shape to accommodate a part of the coil part 31 of the rotation biasing spring 30. The hooking groove 23*b* is formed by hollowing out a part of the front surface 23 to hook a second end 33 of the rotation biasing spring 30 thereon.

The back surface 24 is formed on a plane perpendicular to the axis S, is joined to the end surface of the camshaft 1, and is disposed in slidable contact with the inner wall surface 11*c* of the first housing 11. Further, the back surface 24 is provided with a fitting hole 24*a* into which a positioning pin P to be assembled in the fitting hole 1*e* of the camshaft 1 is fitted. The fitting hole 25 is formed to have an inner diameter dimension such that a cylindrical part 50*a* of the fastening bolt 50 is closely fitted.

Figure 5:
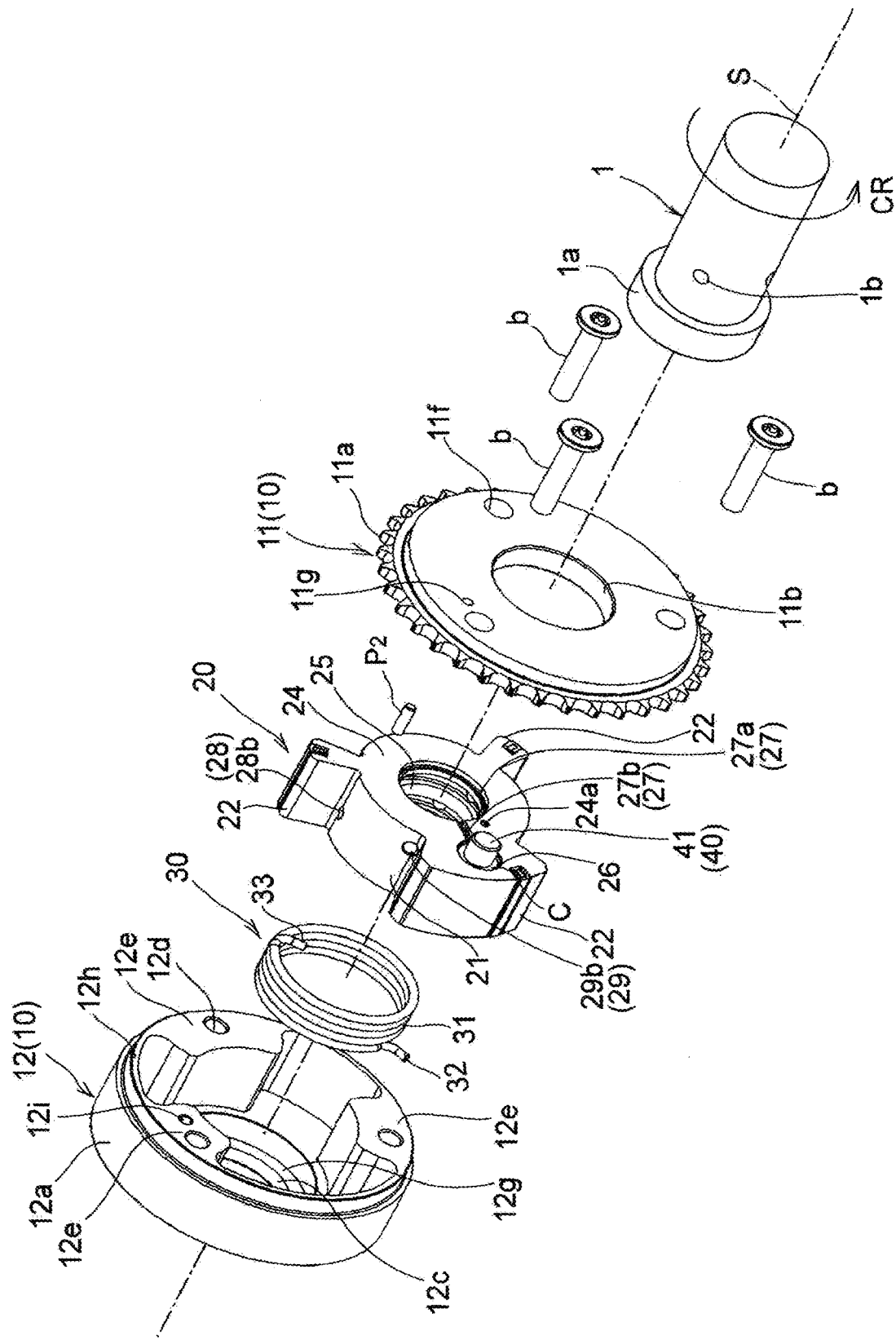
FIG. 5 is an exploded perspective view of the housing rotor, the vane rotor, the rotation biasing spring, and the camshaft included in the valve timing changing device of the disclosure, as viewed obliquely from the back on the camshaft side.
Figure 6:
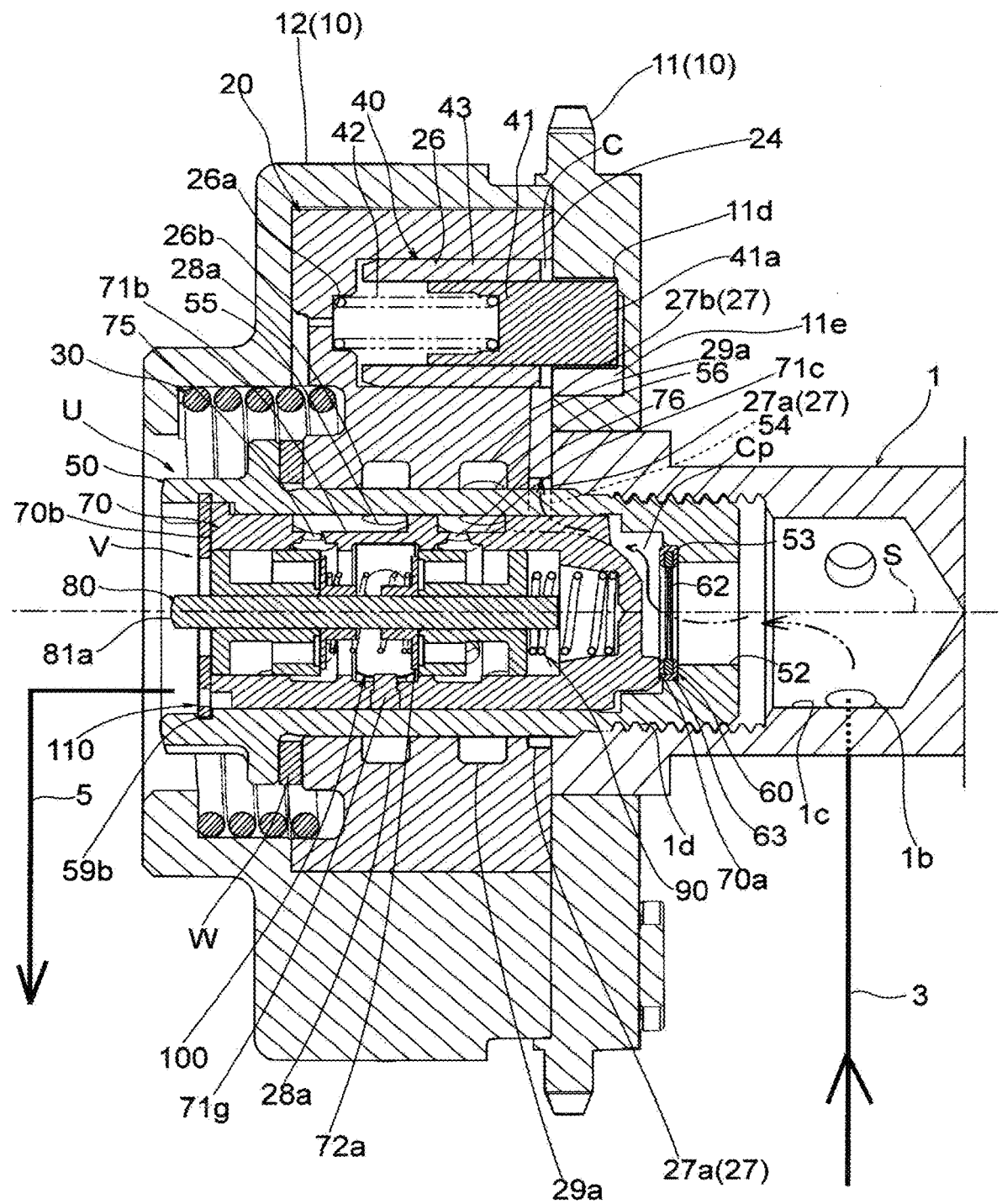
FIG. 6 is a cross-sectional view showing a locked state in which the lock mechanism is operated in a state in which the valve timing changing device of the disclosure is fastened and fixed to the camshaft by the fastening bolt.
Figure 7:
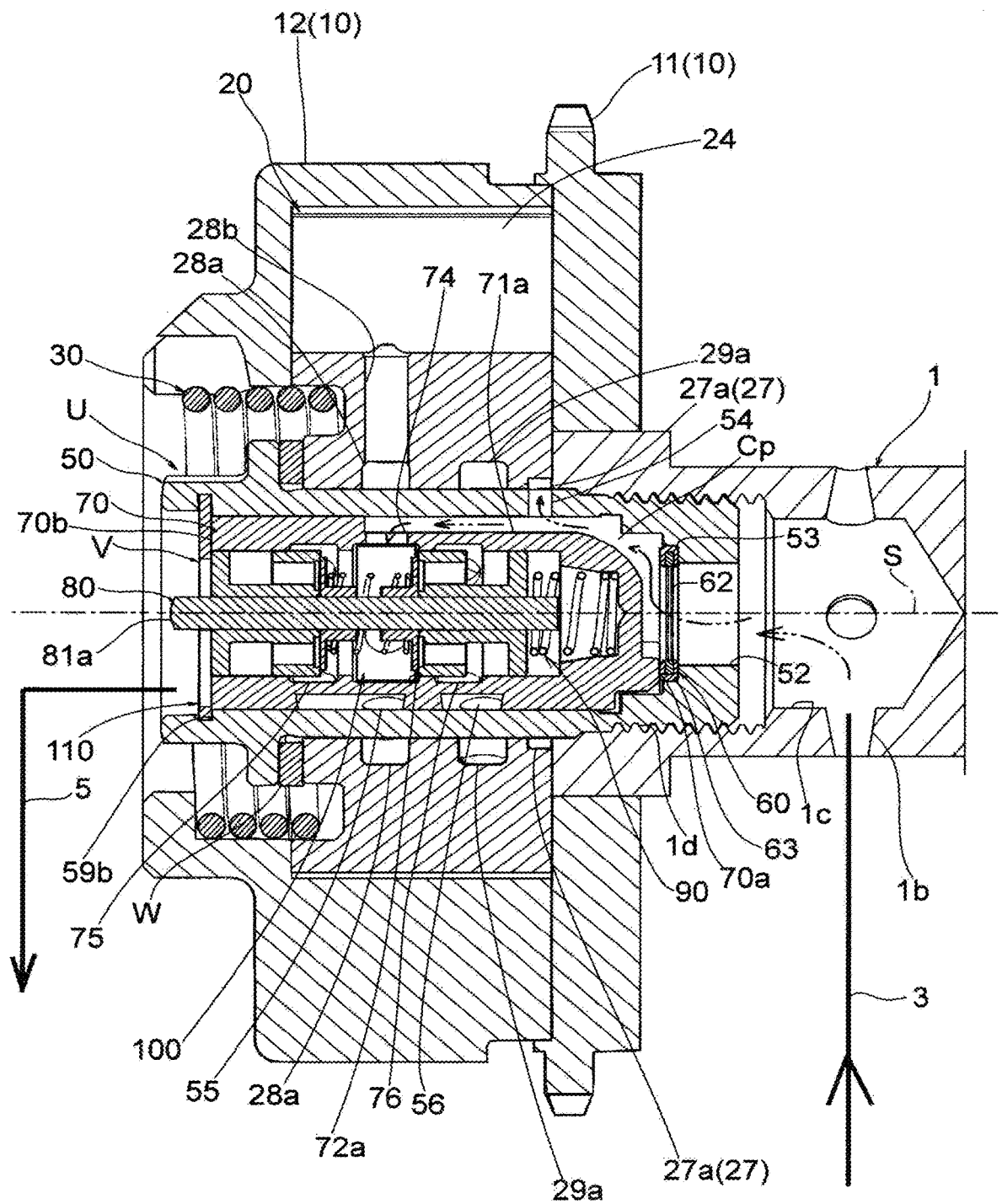
FIG. 7 is a cross-sectional view showing a passage in the region around the fluid control valve unit in a state in which the valve timing changing device of the disclosure is fastened and fixed to the camshaft by the fastening bolt.

As shown in FIGS. 5 and 6, the recess 26 is formed in one vane 22 to accommodate the lock mechanism 40, and includes a receiving part 26*a* for receiving a biasing spring 42 included in the lock mechanism 40, and a communication passage 26*b* communicating with the outside of the vane rotor 20.

The groove passage 27 is formed by an annular groove passage 27*a* and a straight groove passage 27*b*, and cooperates with the end surface of the camshaft 1 and the inner wall surface 11*c* of the housing rotor 10 to supply hydraulic oil to and discharge hydraulic oil from the lock mechanism 40. That is, the groove passage 27 serves to supply the hydraulic oil guided through a through passage 54 of the fastening bolt 50 to the lock mechanism 40 upstream of the fluid control valve V in the flow direction of the supplied hydraulic oil to release the lock and to discharge the hydraulic oil when locking. Since the groove passage 27 is formed in the back surface 24 of the vane rotor 20, it is easy to machine and provides lubrication to the sliding region of the inner wall surface 11*c*.

Figure 19:
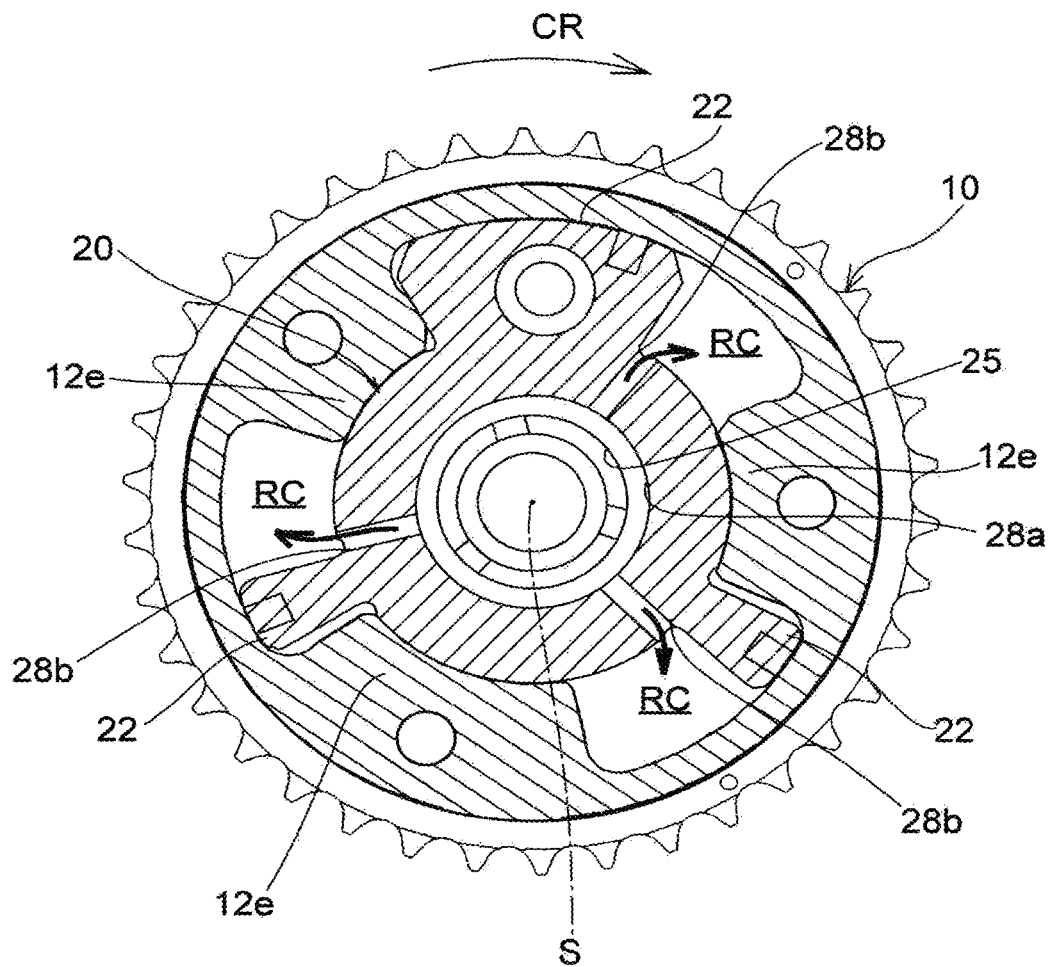
FIG. 19 is a cross-sectional view showing a state in which the vane rotor is positioned at the most retarded position with respect to the housing rotor.

The retard passage 28 supplies and discharges hydraulic oil to and from the retard chamber RC, and as shown in FIG. 19, is formed by an annular groove 28*a* formed in the inner peripheral surface of the fitting hole 25 and a through passage 28*b* radially penetrating the hub 21 from the annular groove 28*a*.

Figure 20:
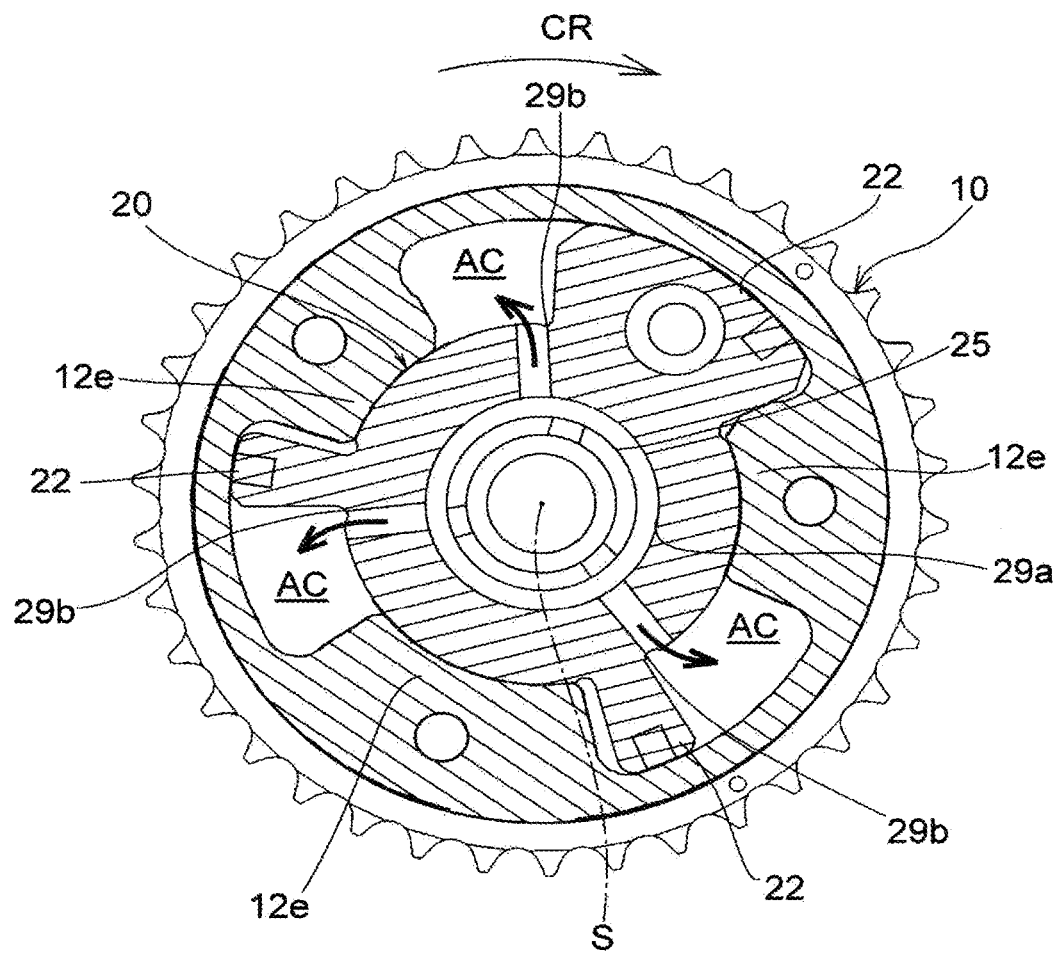
FIG. 20 is a cross-sectional view showing a state in which the vane rotor is positioned at the most advanced position with respect to the housing rotor.

The advance passage 29 supplies and discharges hydraulic oil to and from the advance chamber AC, and as shown in FIG. 20, is formed by an annular groove 29*a* formed in the inner peripheral surface of the fitting hole 25 and a through passage 29*b* radially penetrating the hub 21 from the annular groove 29*a*.

The rotation biasing spring 30 is a coil spring including a coil part 31, a first end 32 and a second end 33, as shown in FIGS. 4 to 7.

The coil part 31 of the rotation biasing spring 30 is accommodated in the annular recess 23*a* of the vane rotor 20 and the recess 12*g* of the housing rotor 10, and the first end 32 is hooked by the hooking groove 12*f* of the housing rotor 10, and the second end 33 is hooked by the hooking groove 23*b* of the vane rotor 20. Thereby, the rotation biasing spring 30 rotationally biases the vane rotor 20 with respect to the housing rotor 10 in the advancing direction.

In this way, by adopting the rotation biasing spring 30 that biases in the advancing direction, it is possible to improve the responsiveness by assisting the operating torque when advancing. Further, controllability may be improved by setting the load of the rotation biasing spring 30 so that the difference between the operating torque and the load torque is substantially equal when advancing and retarding.

Figure 18:
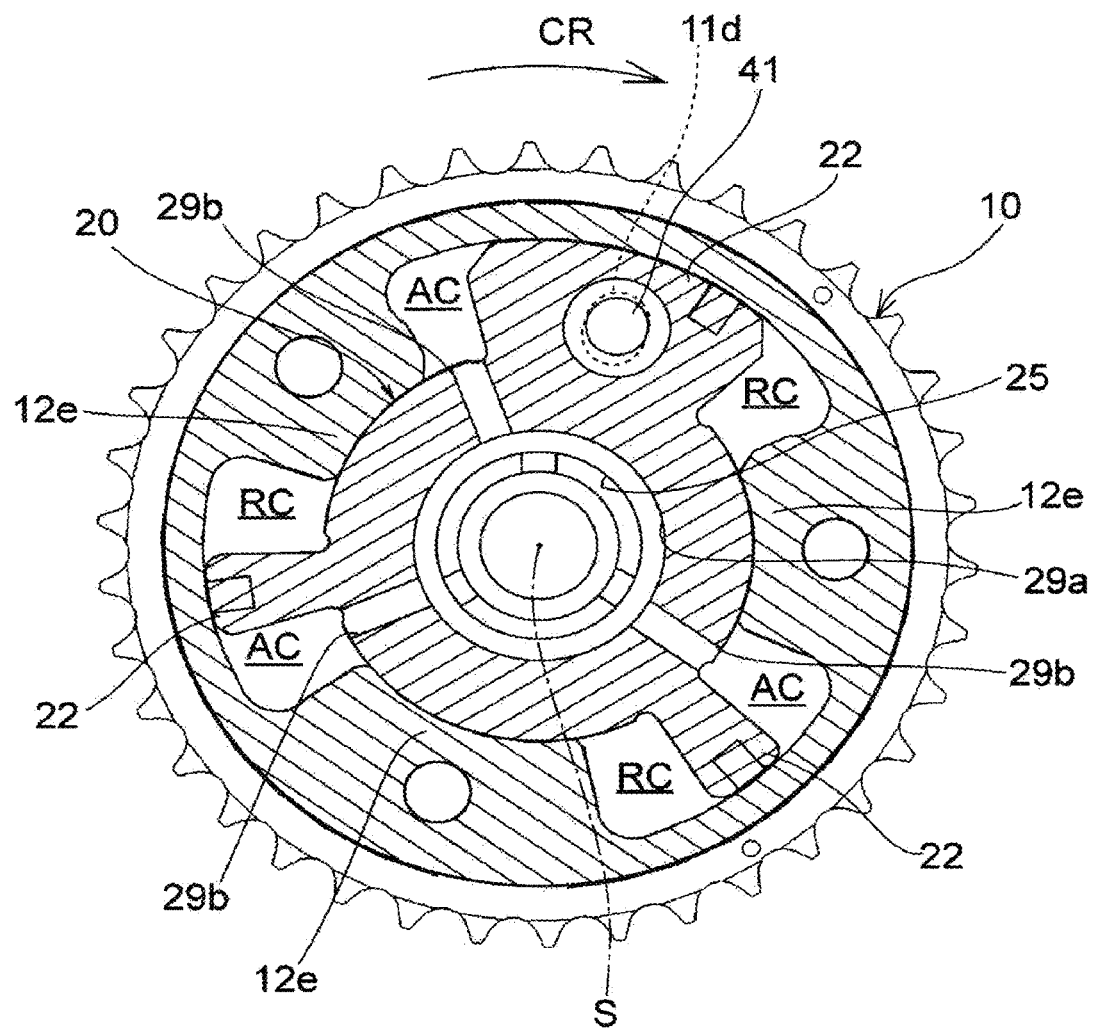
FIG. 18 is a cross-sectional view showing a state in which the vane rotor is locked in an intermediate position with respect to the housing rotor.

The lock mechanism 40 includes a lock pin 41, a biasing spring 42, and a cylindrical holder 43. As shown in FIG. 18, the lock mechanism 40 locks the vane rotor 20 with respect to the housing rotor 10 at an intermediate position between the most retarded position and the most advanced position.

The lock pin 41 has a substantially cylindrical shape and has a tip pressure receiving part 41a. The lock pin 41 is held in the direction of the axis S with respect to the back surface 24 of the vane rotor 20 to be retractable to fit into the lock hole 11d of the housing rotor 10. The biasing spring 42 biases the lock pin 41 in a protruding direction.

The cylindrical holder 43 is fitted and fixed in the recess 26 of the vane rotor 20 to reciprocally hold the lock pin 41 biased by the biasing spring 42. Further, as shown in FIGS. 5 and 6, the cylindrical holder 43 is disposed to be recessed from the back surface 24 of the vane rotor 20 to define an annular oil reservoir C communicating with the straight groove passage 27b around the lock pin 41. By providing the annular oil reservoir C, the region around the lock pin 41 is filled with hydraulic oil, and the lock may be released smoothly.

When the engine is started, hydraulic oil pressurized by the oil pump 4 is guided to the lock mechanism 40 through the passages 1b and 1c of the camshaft 1, an opening 52 of the fastening bolt 50, a filter part 62 of the filter member 60, a crevice passage $C_p$ defined by a thinned passage 71a, the through passage 54 of the fastening bolt 50, the groove passage 27 and the annular oil reservoir C formed in the back surface 24 of the vane rotor 20, and when the hydraulic pressure applied to the tip pressure receiving part 41a of the lock pin 41 increases, the lock pin 41 is released from the lock hole 11d to release the lock.

In addition, when the hydraulic pressure of the supplied hydraulic oil decreases due to the engine stop, the hydraulic oil acting on the lock pin 41 flows out through the groove passage 27, the through passage 54, the crevice passage $C_p$, the crevice passage $C_p$, the filter part 62, the opening 52, and the passages 1c and 1b, and the hydraulic pressure pressing the lock pin 41 decreases. Then, the lock pin 41 is biased by the biasing spring 42 to fit into the lock hole 11d of the housing rotor 10, and the vane rotor 20 is locked to the intermediate position with respect to the housing rotor 10.

As shown in FIGS. 2, 3 and 6 to 10, the fastening bolt 50 includes a cylindrical part 50a centered on the axis S, an inner peripheral surface 51 for fitting the fluid control valve V, an opening 52, an annular receiving part 53, a through passage 54, a retard passage 55, an advance passage 56, a flanged head 57, a male screw part 58, a positioning recess 59a, and an annular groove 59b.

The cylindrical part 50 a is formed to have an outer diameter dimension that allows it to be closely fitted into the fitting hole 25 of the vane rotor 20. The inner peripheral surface 51 forms a cylindrical surface centered on the axis S to which the sleeve 70 is fitted.

The opening 52 is formed in a circular hole adjacent to the annular receiving part 53 in the direction of the axis S and having a diameter smaller than that of the inner peripheral surface 51, and functions as a passage through which hydraulic oil flows into the fastening bolt 50 on the upstream side of the filter member 60.

The annular receiving part 53 is formed as an annular recess with a receiving surface as a flat surface perpendicular to the axis S to face one end 70a of the sleeve 70 inside the opening 52 in the direction of the axis S, and is formed to receive an elastic part 63 (first elastic part 63a) of the filter member 60 and to position the filter member 60 at a position centered on the axis S.

The through passage 54 introduces or discharges hydraulic oil to or from the lock mechanism 40, and penetrates in a radial direction perpendicular to the axis S in the cylindrical part 50a.

The retard passage 55 extends through the cylindrical part 50a in a radial direction perpendicular to the axis S to communicate with the retard passage 28 of the vane rotor 20.

The advance passage 56 extends through the cylindrical part 50a in a radial direction perpendicular to the axis S to communicate with the advance passage 29 of the vane rotor 20.

The flanged head 57 contacts the front surface 23 of the vane rotor 20 with the washer W therebetween. The male screw part 58 is screwed onto the female screw part 1d of the camshaft 1.

The positioning recess 59a is formed so that a positioning protrusion 79 of the sleeve 70 included in the fluid control valve V and a fitting protrusion 114 of the snap ring 110 are fitted.

The annular groove 59b is formed adjacent to the other end 70b of the sleeve 70 and recessed from the inner peripheral surface 51 for the snap ring 110 to be fitted therein, so that the snap ring 110 is brought into contact with the other end 70b of the sleeve 70 fitted to the inner peripheral surface 51 while compressing the elastic part 63 of the filter member 60.

The filter member 60 catches foreign matter mixed in the hydraulic oil supplied by the oil pump 4, and includes an annular part 61, the filter part 62, and the elastic part 63, as shown in FIGS. 6, 7 and 9 to 12.

The annular part 61 is formed in an annular shape centered on the axis S using a metal material or a resin material with high bending rigidity and sufficient mechanical strength, and defines end surfaces 61a and 61b as two end surfaces that are flat in the direction of the axis S.

The filter part 62 is formed of a metal mesh (punch metal) and coupled to the annular part 61. In addition, the filter part 62 may be molded integrally with the annular part 61 using a resin material.

The elastic part 63 is formed using a rubber material such as acrylic rubber and is provided on the annular part 61, and includes a first elastic part 63a provided on one end surface 61a in the direction of the axis S, a second elastic part 63b provided on the other end surface 61b in the direction of the axis S, and a peripheral elastic part 63c connecting the first elastic part 63a and the second elastic part 63b.

Here, the elastic part 63 is sandwiched in a state of being compressed by a predetermined amount and exerts a biasing force on the sleeve 70 in the direction of the axis S, and performs a sealing function to prevents hydraulic oil from leaking and foreign matter from entering between the contact surface of the annular receiving part 53 and the elastic part 63. The elastic part 63 may be molded integrally with the annular part 61 and the filter part 62 or may be adhered to the annular part 61.

When the filter member 60 is assembled as the fluid control valve unit U, the filter member 60 is sandwiched between the one end 70a of the sleeve 70 and the annular receiving part 53 of the fastening bolt 50, and it is positioned particularly in a region where the region of the filter part 62 faces the thinned passage 71a of the sleeve 70, and the elastic part 63 exerts a biasing force in the direction of the axis S.

The fluid control valve V switches passages to supply or discharge hydraulic oil to the advance chamber AC and the retard chamber RC, and as shown in FIGS. 9, 10 and 13 to 17, includes a sleeve 70, a spool 80, a biasing spring 90 and a check valve 100.

The sleeve 70 is formed in a bottomed cylindrical shape that defines the axis S using aluminum or other metal material, and includes one end 70a and the other end 70b forming two ends in the direction of the axis S, an outer wall 71, thinned passages 71a, 71b and 71c, a first groove passage 71d and through passages $71d_1$ and $71d_2$ forming a part of the discharge passage, a second groove passage 71 and a through passage $71e_1$ forming a part of the discharge passage, a fitting hole 71f, a fitting pin 71g, a communication recess 71h forming a part of the discharge passage, an inner peripheral surface 72, annular grooves 72a, 72b and 72c, an opening 73, a supply port 74, a retard port 75, an advance port 76, a stopper wall 77, a spring receiving part 78 and a positioning protrusion 79.

As shown in FIGS. 10 and 13 to 16, the one end 70a has an arcuate shape centered on the axis S and a flat surface perpendicular to the axis S, and is formed to abut on the elastic part 63 (second elastic part 63b) of the filter member 60. The one end 70a is received by the annular receiving part 53 of the fastening bolt 50 with the filter member 60 interposed therebetween in the assembled state.

As shown in FIGS. 9 and 13 to 16, the other end 70b has an annular shape centered on the axis S and a flat surface perpendicular to the axis S, and is formed to abut on the annular receiving part 111 of the snap ring 110. The other end 70b is received by the annular receiving part 111 of the snap ring 110 fitted in the annular groove 59b of the fastening bolt 50 in the direction of the axis S in the state where the sleeve 70 is assembled.

The outer wall 71 is formed as a cylindrical surface centered on the axis S and closely fitted into the inner peripheral surface 51 of the fastening bolt 50.

The thinned passage 71a is formed by hollowing out a part of the outer wall 71 over a region extending from the central region of the one end 70a outside the bottom wall so as to be bifurcated and facing the supply port 74 (first supply port 74a and second supply port 74b), and defines the crevice passage $C_p$ together with the inner wall of the fastening bolt 50.

The thinned passage 71b is formed by hollowing out a part of the outer wall 71 in a region facing the retard passage 55 of the fastening bolt 50 from the retard port 75, and functions as a passage between the retard port 75 and the retard passage 55.

The thinned passage 71c is formed by hollowing out a part of the outer wall 71 in a region facing the advance passage 56 of the fastening bolt 50 from the advance port 76, and functions as a passage between the advance port 76 and the advance passage 56.

The groove passage 71d is formed extending in the direction of the axis S in the outer wall 71 and functions as a discharge passage which cooperates with the through passage $71d_1$ to communicate with the retard port 75 to discharge hydraulic oil when the first valve 82 is closed, and cooperates with the through passage $71d_2$ to communicate with the advance port 76 to discharge hydraulic oil when the second valve 83 is closed.

The groove passage 71 is formed extending in the direction of the axis S in the outer wall 71 at a position away from the groove passage 71d and functions as a discharge passage which cooperates with the through passage $71e_1$ to discharge hydraulic oil that has accumulated in the region where the biasing spring 90 is disposed and which forms a breathing passage.

The fitting hole 71f is for fitting the fitting pin 71g, and is formed as a two-stage hole penetrating in the radial direction in the bottom wall of the annular groove 72a.

The fitting pin 71g is formed as a stepped pin in which two cylinders having different outer diameters are formed as a single piece using iron or steel material, and is closely fitted into the fitting hole 71f and protrudes radially inward from the bottom surface of the annular groove 72a so as not to interfere with the spool 80.

The communication recess 71h is formed in the outer wall 71 near the opening 73 so that the first groove passage 71d and the second groove passage 71 may communicate in the circumferential direction.

The inner peripheral surface 72 is formed in a cylindrical shape centered on the axis S, and brings the first valve 82 (first land $82a_1$) and the second valve 83 (second land $83a_1$) of the spool 80 into close contact and slidably guides them.

The annular groove 72a is formed as a cylindrical surface by hollowing out an annular shape to be recessed from the inner peripheral surface 72 with a width wider than the opening width of the supply port 74 in the direction of the axis S in the region facing the supply port 74 as an inlet, and the check valve 100 is disposed inside the annular groove 72a.

The annular groove 72b is formed by hollowing out an annular shape to be recessed from the inner peripheral surface 72 in a region facing the retard port 75 as the first communication port, and functions as a hydraulic oil passage.

The annular groove 72c is formed by hollowing out an annular shape to be recessed from the inner peripheral surface 72 in a region facing the advance port 76 as the second communication port, and functions as a hydraulic oil passage.

The opening 73 allows a rod 81 of the spool 80 to protrude in the direction of the axis S.

The supply port 74 functions as an inlet into which hydraulic oil as a fluid flows, communicates with the crevice passage $C_p$, and is disposed downstream of the through passage 54 in the crevice passage $C_p$.

Figure 10:
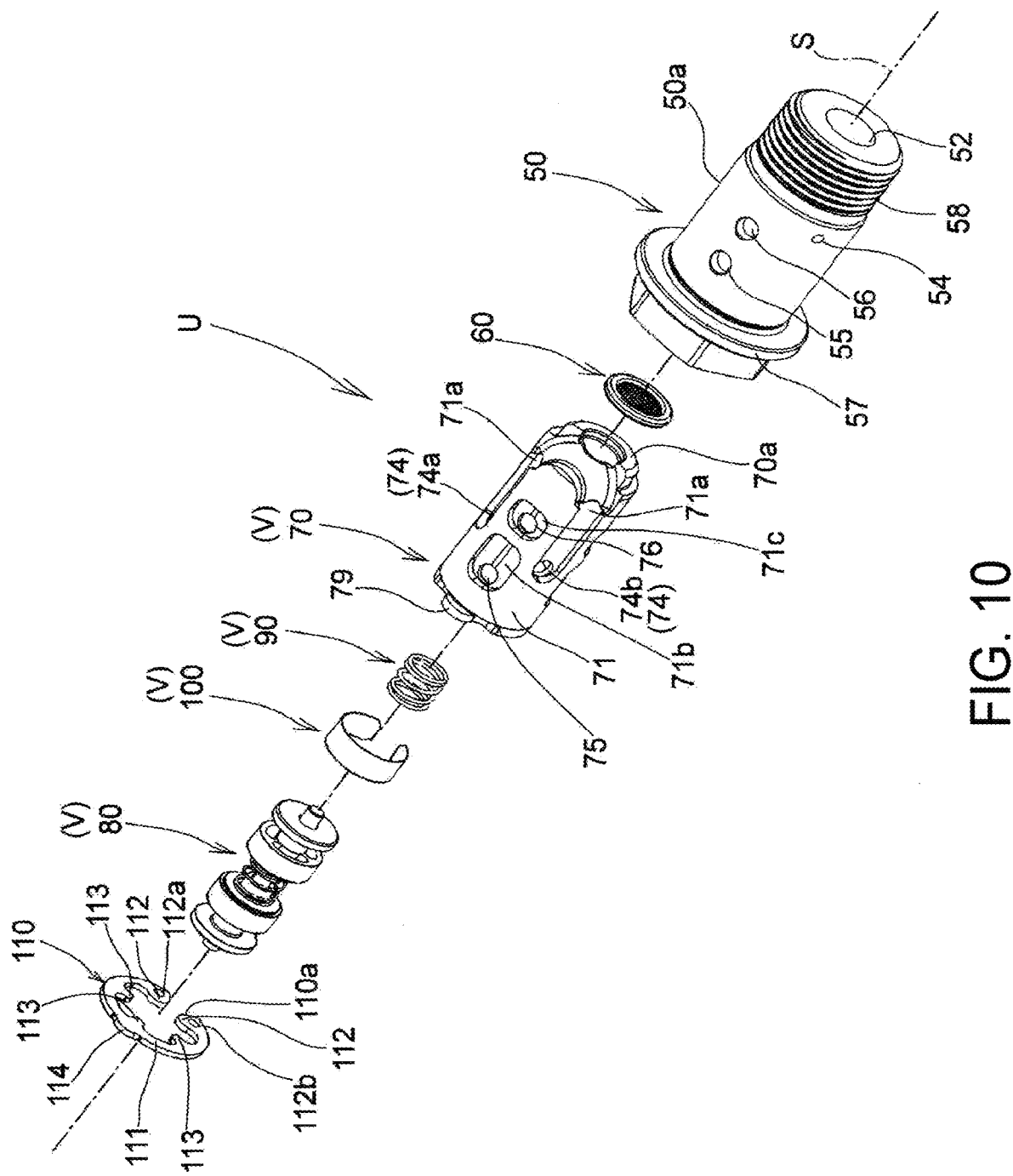
FIG. 10 is an exploded perspective view of the fluid control valve unit shown in FIG. 8, as viewed obliquely from the back on the camshaft side to which the valve timing changing device is attached.
Figure 11:
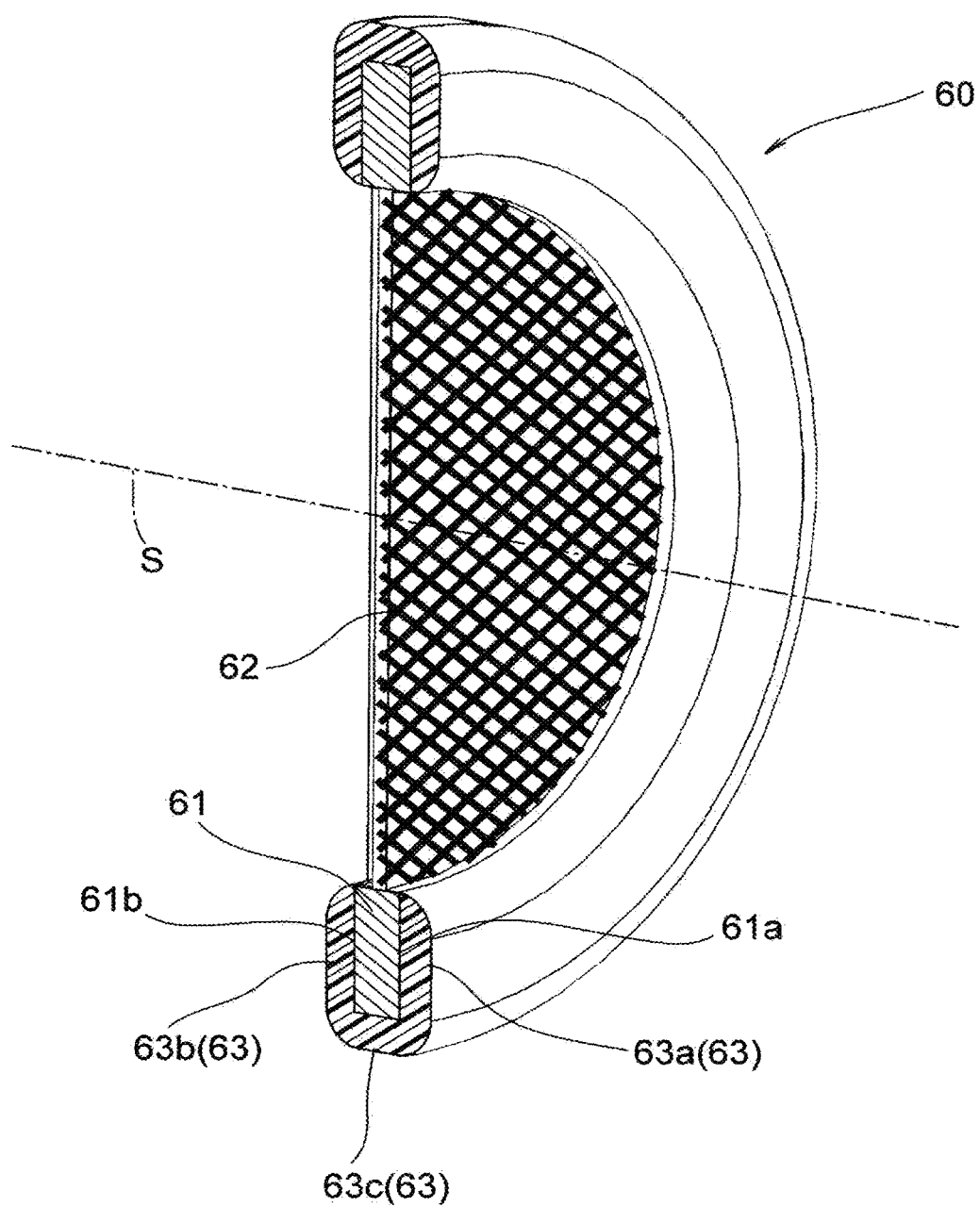
FIG. 11 shows the filter member included in the fluid control valve unit of the disclosure, and is a perspective cross-sectional view taken along a plane including the axis.
Figure 12:
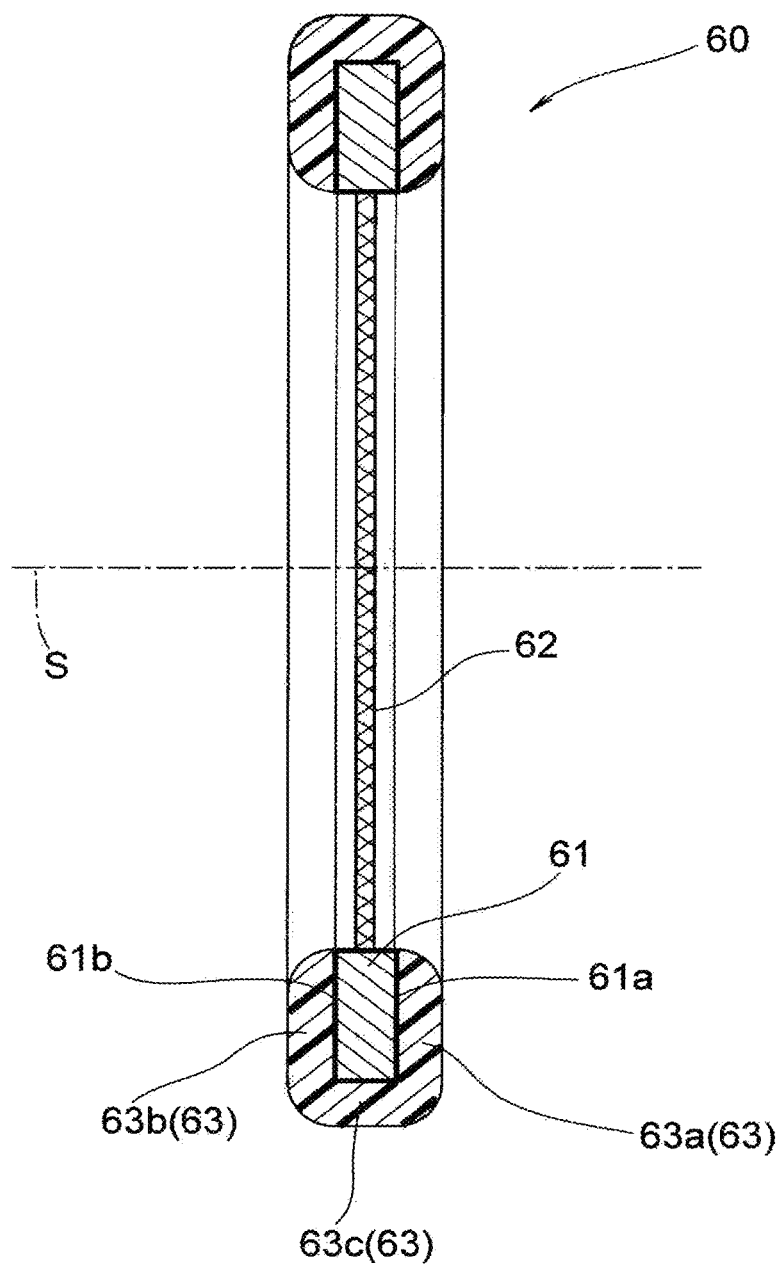
FIG. 12 shows the filter member included in the fluid control valve unit of the disclosure, and is a cross-sectional view taken along a plane including the axis.
Figure 13:
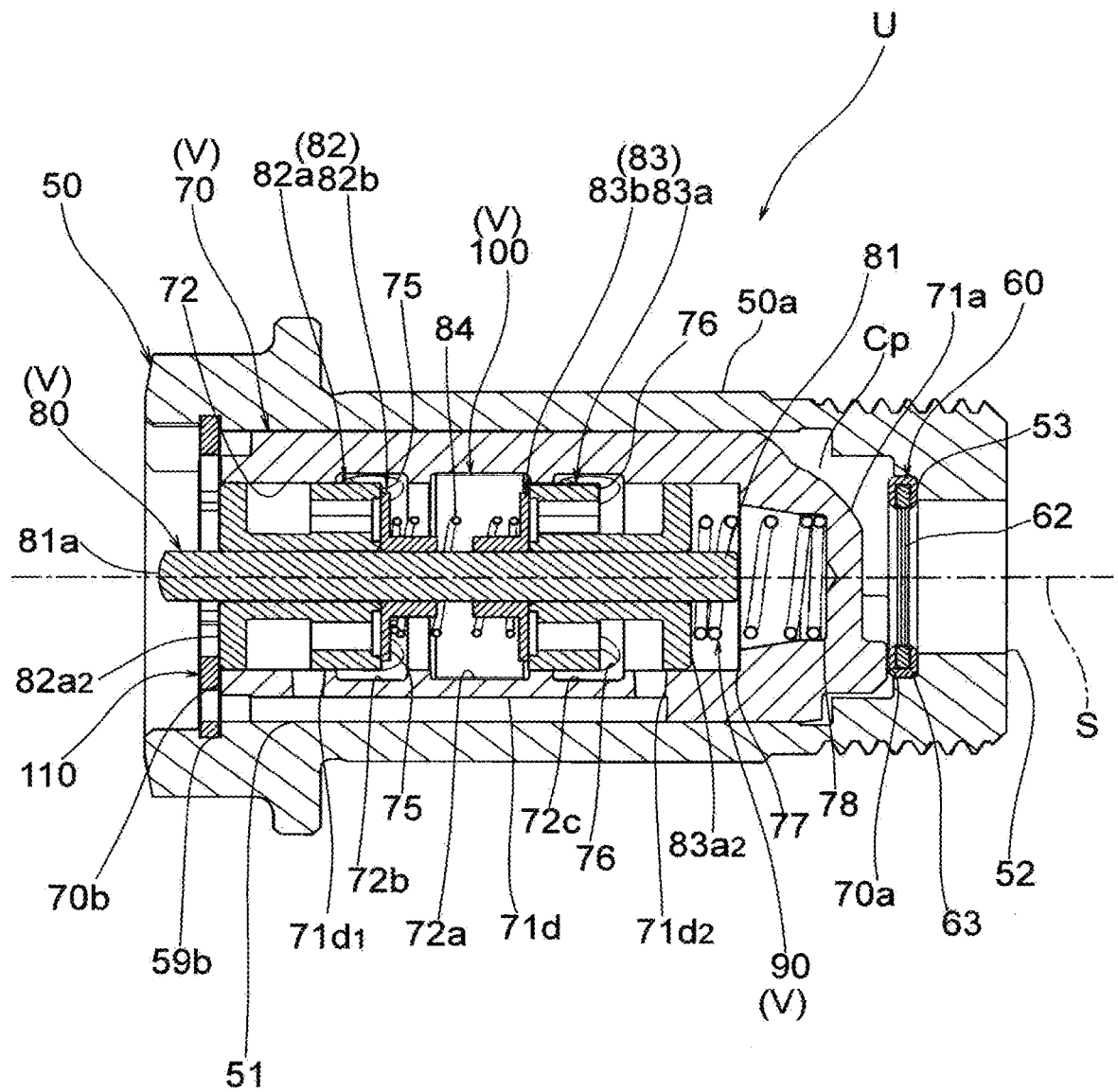
FIG. 13 shows the fluid control valve unit of the disclosure, and is a cross-sectional view in the region of the discharge passage that may communicate with the first communication port and the second communication port.
Figure 14:
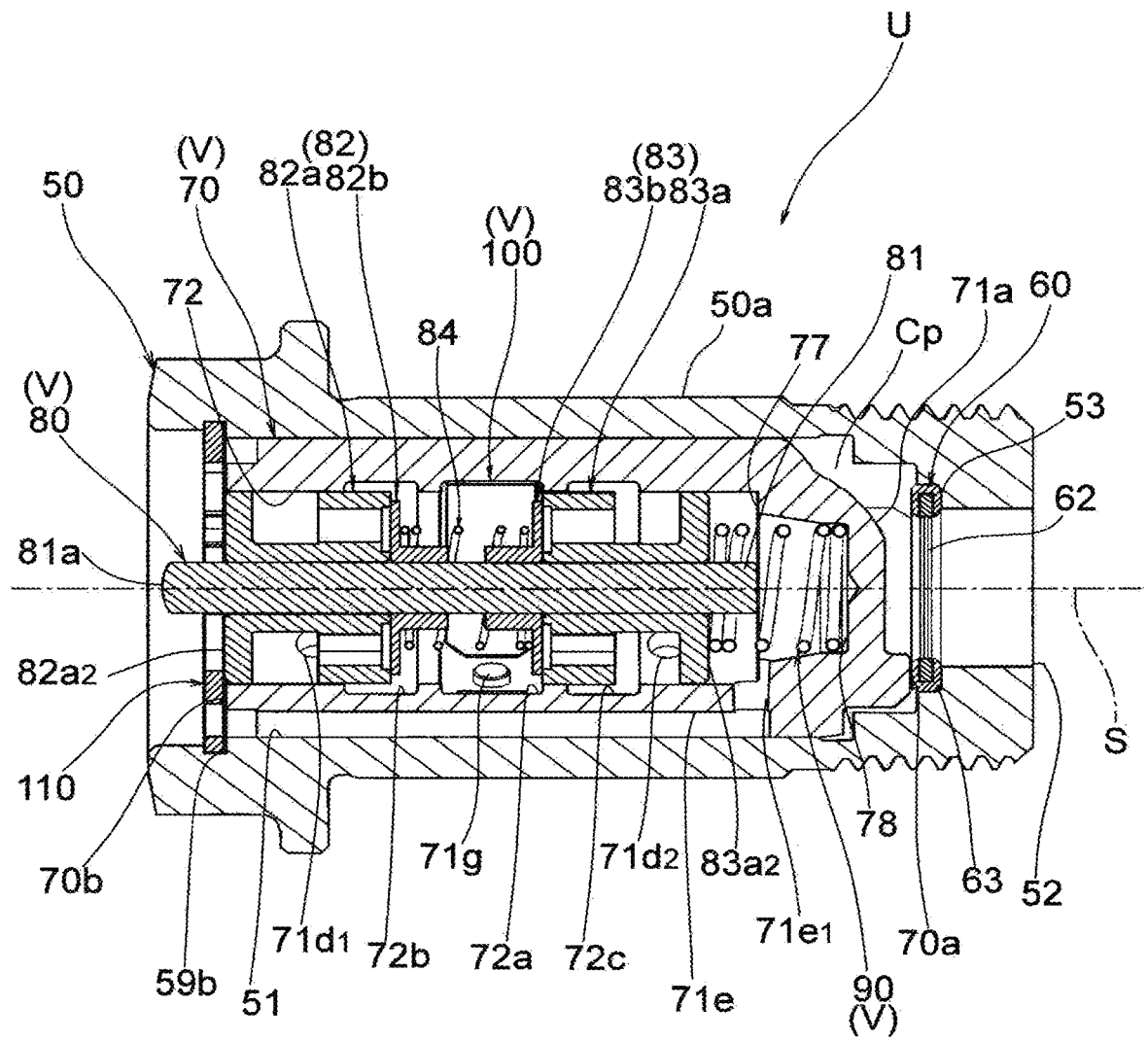
FIG. 14 shows the fluid control valve unit of the disclosure, and is a cross-sectional view in the region of the discharge passage communicating with the region where the biasing spring that biases the spool is located.

Further, as shown in FIG. 10, the supply port 74 includes a first supply port 74a as a first inlet and a second supply port 74b as a second inlet, which are spaced apart from each other around the axis S.

The retard port 75 functions as a first communication port that communicates with the outside to allow the hydraulic oil as a fluid to pass through, communicates with the retard passage 55 of the fastening bolt 50 through the thinned passage 71b, and also communicates with the retard chamber RC through the retard passage 28 of the vane rotor 20.

The advance port 76 functions as a second communication port that communicates with the outside to allow the hydraulic oil as a fluid to pass through, communicates with the advance passage 56 of the fastening bolt 50 through the thinned passage 71c, and also communicates with the advance chamber AC through the advance passage 29 of the vane rotor 20.

Figure 15:
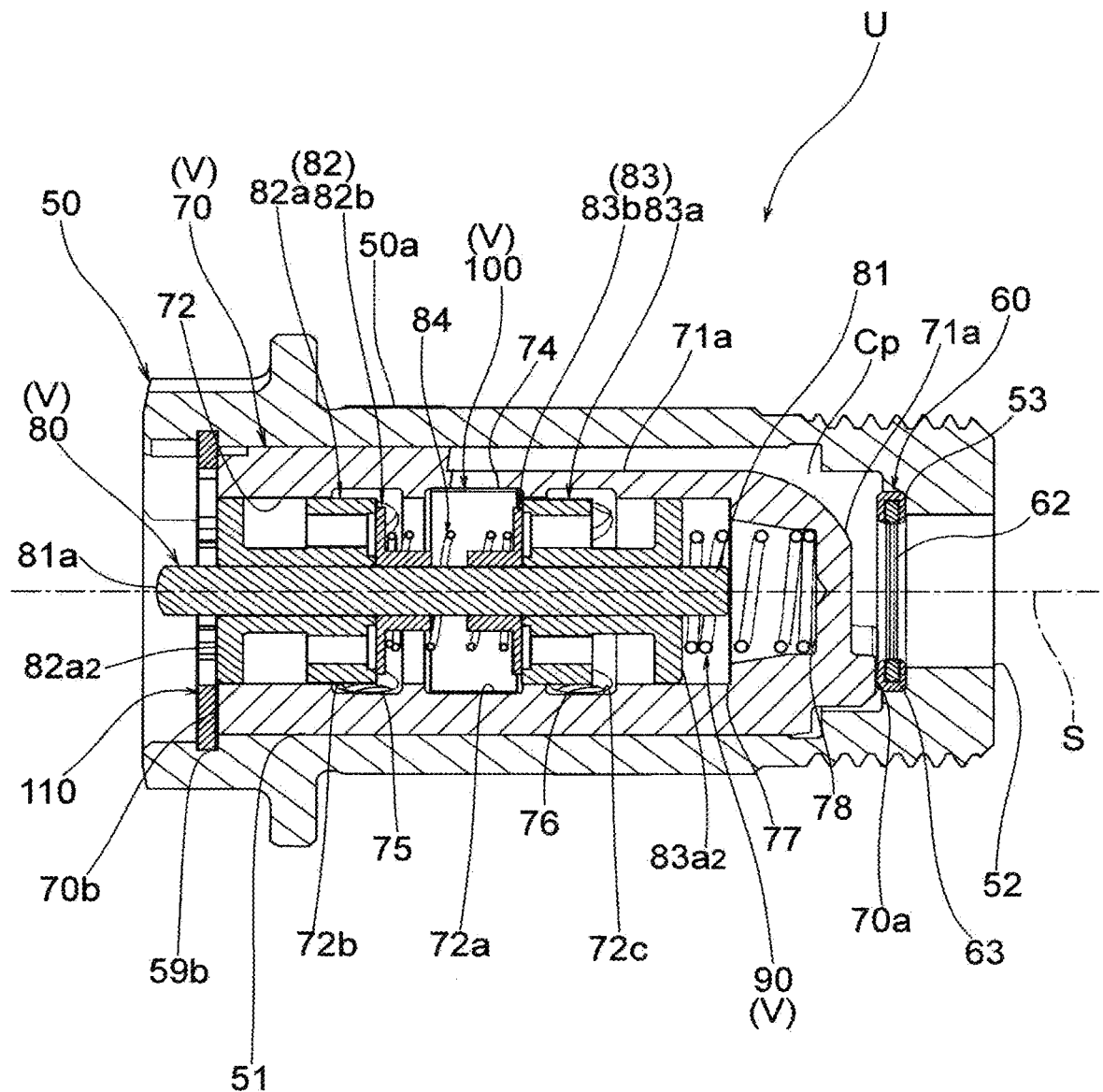
FIG. 15 shows the fluid control valve unit of the disclosure, and is a cross-sectional view in the region of the thinned passage and the inlet (supply port).
Figure 16:
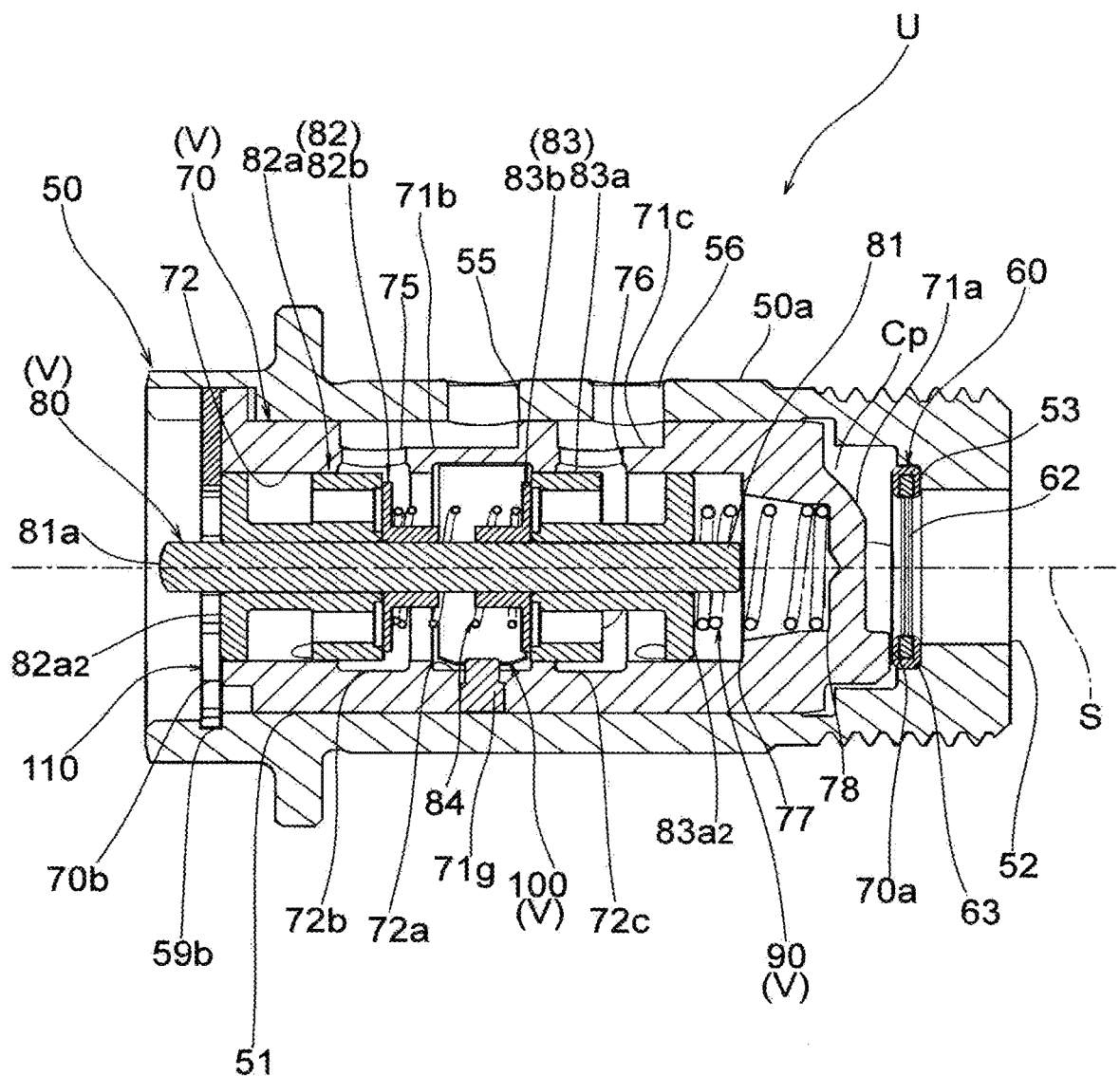
FIG. 16 shows the fluid control valve unit of the disclosure, and is a cross-sectional view in the region of the first communication port (retard port) and the second communication port (advance port).
Figure 17:
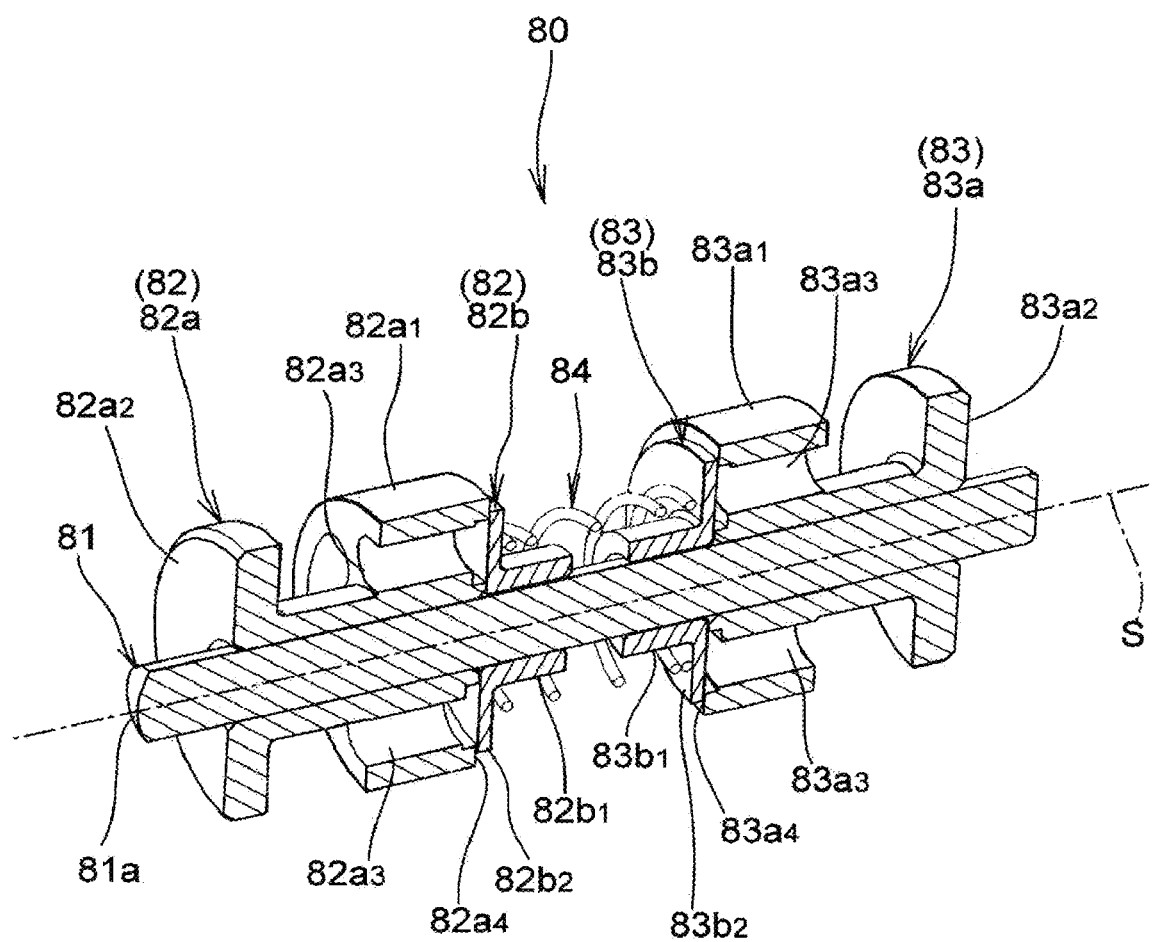
FIG. 17 shows the spool included in the fluid control valve unit of the disclosure, and is a perspective cross-sectional view taken along a plane including the axis.

Here, as shown in FIGS. 15 and 16, the retard port 75 and the advance port 76 are disposed on both sides of the supply port 74 in the direction of the axis S. That is, the communication ports communicating with the outside to allow the fluid to pass through include the first communication port (retard port 75) and the second communication port (advance port 75) located on both sides of the inlet (supply port 74) in the direction of the axis S.

The stopper wall 77 receives the end surface $83a_2$ of the second valve 83 of the spool 80 to stop the spool 80 at the deepest position corresponding to the advance mode.

The spring receiving part 78 receives the end of the biasing spring 90.

The positioning protrusion 79 is fitted into the positioning recess 59a of the fastening bolt 50 to position the sleeve 70 at a predetermined position around the axis S with respect to the fastening bolt 50 when the sleeve 70 is fitted onto the inner peripheral surface 51 of the fastening bolt 50.

As described above, the outer wall 71 of the sleeve 70 is formed with the discharge passages (the first groove passage 71d, the second groove passage 71e, and the communication recess 71h) through which the hydraulic oil to be discharged to the outside passes. Therefore, there is no need to provide a discharge passage in the fastening bolt 50 as a passage member, and thus the fluid control valve V including the sleeve 70 may be applied to various existing passage members.

As shown in FIGS. 13 to 17, the spool 80 is disposed inside the sleeve 70 to be slidable on the inner peripheral surface 72, and includes a rod 81 extending in the direction of the axis S, a first valve 82 and a second valve 83 provided on the rod 81, and a compression spring 84 disposed between the first valve 82 and the second valve 83.

The rod 81 is formed to extend in the direction of the axis S and includes an end 81a exposed to the outside. The drive shaft 7a of the electromagnetic actuator 7 is engaged with the end 81a, and a driving force is exerted against the biasing force of the biasing spring 90.

The first valve 82 opens and closes the passage between the supply port 74 and the retard port 75, and includes a first fixed part 82a fixed to the rod 81 and a first movable part 82b movably supported along the rod 81 and biased by the compression spring 84.

The first fixed part 82a includes a first land $82a_1$ that slides in close contact with the inner peripheral surface 72, an end surface $82a_2$, a first internal passage $82a_3$ and an end surface $82a_4$.

The first land $82a_1$ is formed to be a cylindrical surface centered on the axis S with an outer diameter that is substantially equal to or slightly smaller than the inner diameter of the inner peripheral surface 72 and is formed to have a width that closes the retard port 75, and the first land $82a_1$ opens or closes the retard port 75.

The first movable part 82b functions as a check valve in cooperation with the compression spring 84, and includes a first fitting part $82b_1$ slidably fitted to the rod 81 and a first lid part $82b_2$ detachably contacting the end surface $82a_4$ to open and close the first internal passage $82a_3$.

The second valve 83 opens and closes the passage between the supply port 74 and the advance port 76, and includes a second fixed part 83a fixed to the rod 81 and a second movable part 83b movably supported along the rod 81 and biased by the compression spring 84.

The second fixed part 83a includes a second land $83a_1$ that slides in close contact with the inner peripheral surface 72, an end surface $83a_2$, a second internal passage $83a_3$ and an end surface $83a_4$.

The second land $83a_1$ is formed to be a cylindrical surface centered on the axis S with an outer diameter that is substantially equal to or slightly smaller than the inner diameter of the inner peripheral surface 72 and is formed to have a width that closes the advance port 76, and the second land $83a_1$ opens or closes the advance port 76.

The second movable part 83b functions as a check valve in cooperation with the compression spring 84, and includes a second fitting part $83b_1$ slidably fitted to the rod 81 and a second lid part $83b_2$ detachably contacting the end surface $83a_4$ to open and close the second internal passage $83a_3$.

The compression spring 84 is a compression type coil spring, is disposed between the first movable part 82b of the first valve 82 and the second movable part 83b of the second valve 83, and exerts a biasing force so that the first lid part $82b_2$ closes the first internal passage $82a_3$, and the second lid part $83b_2$ closes the second internal passage $83a_3$.

Here, the relationship between the biasing force of the compression spring 84 and the passage resistance of the through passage $71d_1$ and the through passage $71d_2$ forming a part of the discharge passage will be described.

When the first valve 82 is in the closed state and the pressure of the hydraulic oil flowing from the retard port 75 is large, the first lid part $82b_2$ opens, and the hydraulic oil discharged from the discharge passage (through passage $71d_1$) is small, and the hydraulic oil actively flows into the advance port 76 side; when the pressure of the hydraulic oil flowing from the retard port 75 is small, the first lid part $82b_2$ is closed, and the hydraulic oil is actively discharged from the discharge passage (through passage $71d_1$).

Further, when the second valve 83 is in the closed state and the pressure of the hydraulic oil flowing from the advance port 76 is large, the second lid part $83b_2$ opens, and the hydraulic oil discharged from the discharge passage (through passage $71d_2$) is small, and the hydraulic oil actively flows into the retard port 75 side; when the pressure of the hydraulic oil flowing from the advance port 76 is small, the second lid part $83b_2$ is closed, and the hydraulic oil is actively discharged from the discharge passage (through passage $71d_2$).

The biasing force of the compression spring 84 and the passage resistance of the through passages $71d_1$ and $71d_2$ are set to perform the above operation.

The biasing spring 90 is a compression type coil spring, and as shown in FIGS. 13 to 16, is assembled so that one end of the biasing spring 90 contacts the end surface $83a_2$ of the spool 80, and the other end of the biasing spring 90 contacts the spring receiving part 78 of the sleeve 70. When in the rest state, the biasing spring 90 exerts a biasing force to stop the spool 80 at a rest position where the end surface $82a_2$ of the spool 80 is brought into contact with protruding receiving parts 112 and 113 of the snap ring 110, that is, a position corresponding to the retard mode.

The check valve 100 is a C-shaped leaf spring formed by being bent in advance to bend a leaf spring made of spring steel in an annular shape with two ends facing each other to form a notch with a predetermined gap and to have an outer diameter larger than the inner diameter of the annular groove 72a.

The check valve 100 is disposed in the annular groove 72a of the sleeve 70 to be able to be contracted in diameter so that the fitting pin 71g is positioned in the gap of the notch, and the check valve 100 functions as a check valve that allows only the flow of the hydraulic oil supplied internally through the supply port 74 of the sleeve 70.

In the check valve 100, the opening characteristics are set so that hydraulic oil supplied flows through the passages 1b and 1c, the opening 52, the filter part 62, the crevice passage $C_p$ defined by the thinned passage 71a and the supply port 74 into the fluid control valve V, and flows from the retard port 75 into the retard chamber RC or from the advance port 76 into the advance chamber AC, and then the lock is released when the hydraulic pressure of the hydraulic oil filled in the through passage 54 and the groove passage 27 reaches a hydraulic pressure capable of releasing the lock mechanism 40.

Figure 8:
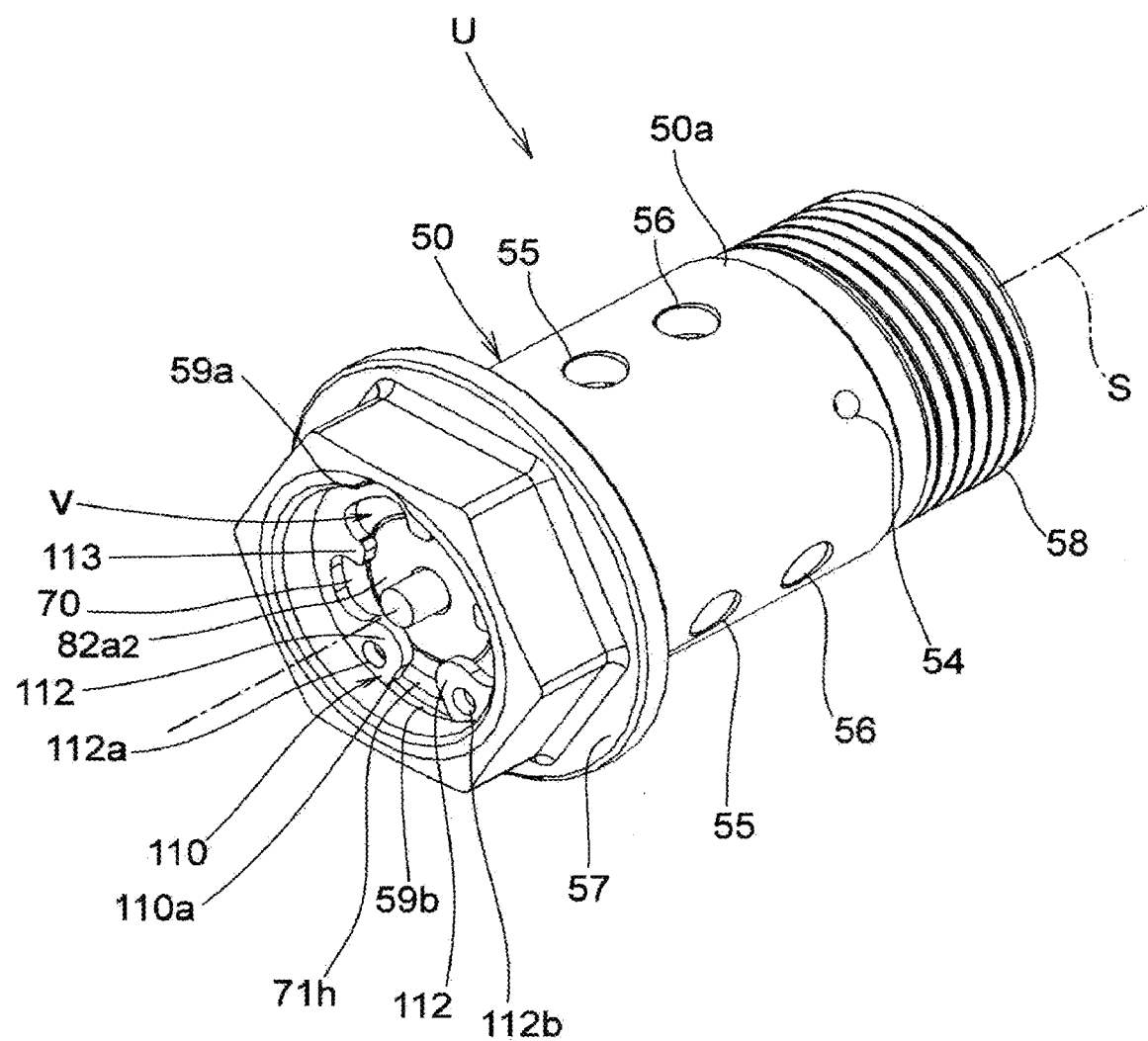
FIG. 8 is an external perspective view showing the fluid control valve unit of the disclosure.
Figure 9:
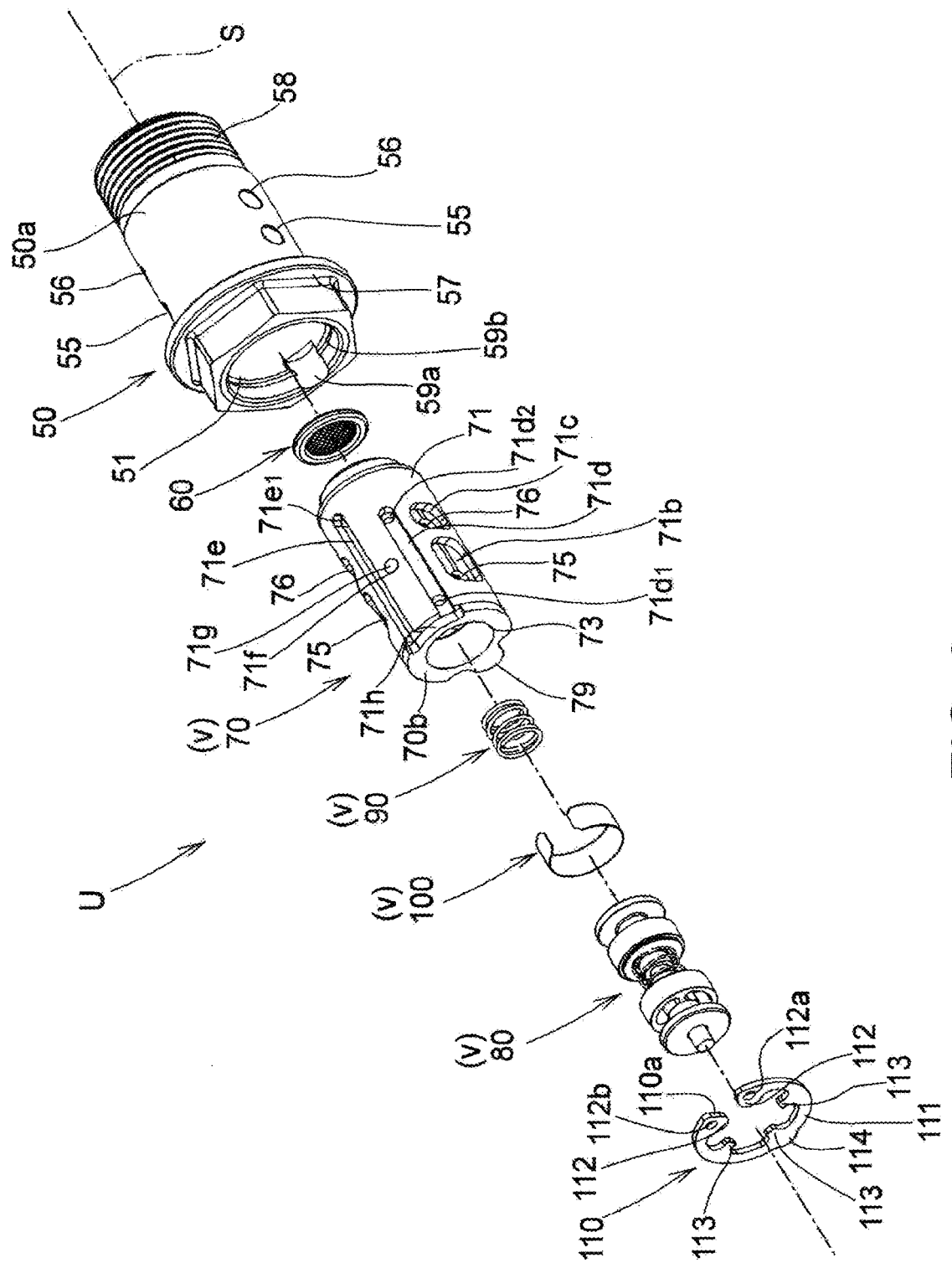
FIG. 9 is an exploded perspective view of the fluid control valve unit shown in FIG. 8, as viewed obliquely from the front opposite to the camshaft side to which the valve timing changing device is attached.

The snap ring 110 is fitted into the annular groove 59b of the fastening bolt 50, and is made of spring steel or the like. As shown in FIGS. 8 to 10, the snap ring 110 is formed to have a flat plate shape extending in a direction perpendicular to the axis S and to have a substantially C shape having a notch 110a with a predetermined gap. The snap ring 110 includes an annular receiving part 111, multiple (here, five) protruding receiving parts 112 and 113 protruding radially inwardly from the annular receiving part 111 at substantially equal intervals around the axis S, and a fitting protrusion 114.

The annular receiving part 111 receives the other end 70b of the sleeve 70 inserted into the inner peripheral surface 51 of the fastening bolt 50.

The two protruding receiving parts 112 and the three protruding receiving parts 113 respectively receive the other end 70b of the sleeve 70 in the base side region and detachably receive the end surface 82a of the spool 80 in the tip side region.

The two protruding receiving parts 112 are provided near two ends that define the notch 110a, and are formed with two circular holes 112a and 112b.

The two circular holes 112a and 112b are for inserting the tip of a tool (for example, a snap ring plier) used when attaching the snap ring 110 to the annular groove 59b.

In the snap ring 110 configured as described above, the notch 110a and the two circular holes 112a and 112b also function as discharge ports capable of discharging hydraulic oil flowing through the discharge passage (the first groove passage 71d, the second groove passage 71e, and the communication recess 71h).

The fitting protrusion 114 is formed to fit into the positioning recess 59a of the fastening bolt 50 at an angular position about the axis S so that the discharge ports (the notch 110a and the two circular holes 112a and 112b) corresponds to the discharge passage (the first groove passage 71d, the second groove passage 71e, and the communication recess 71h).

That is, as shown in FIGS. 10 and 13 to 16, in a state where the filter member 60 is fitted in the annular receiving part 53 of the fastening bolt 50, the fluid control valve V (the sleeve 70, the spool 80, the biasing spring 90, and the check valve 100) is fitted in the inner peripheral surface 51 of the fastening bolt 50, and one end 70a of the sleeve 70 pressed the filter member 60 in the direction of the axis S, the snap ring 110 is configured so that by being fitted into the annular groove 59b of the fastening bolt 50, it may receive the other end 70b of the sleeve 70 accommodated in the fastening bolt 50 and detachably receive the spool 80, and may discharge hydraulic oil flowing through the discharge passage (the first groove passage 71d, the second groove passage 71d, and the communication recess 71h) formed in the fastening bolt 50.

In this manner, in the sleeve 70, one end 70a abuts against the annular receiving part 53 with the filter member 60 including the elastic part 63 interposed therebetween in the direction of the axis S within the fastening bolt 50, and the other end 70b abuts against the snap ring 110 fitted in the annular groove 59b of the fastening bolt 50, and the sleeve 70 is fixed with the biasing force of the elastic part 63 exerted in the direction of the axis S.

As described above, the fluid control valve unit U includes a fluid control valve V including a bottomed cylindrical sleeve 70 defining an axis S, having an inflow port (supply port 74) for hydraulic oil and a communication port (the retard port 75 as the first communication port, and the advance port 76 as the second communication port) communicating with the outside for the hydraulic oil to pass through, and a spool 80 slidably disposed within the sleeve 70 for opening and closing the communication port (the retard port 75 and the advance port 76); a cylindrical passage member (fastening bolt 50) having an inner peripheral surface 51 into which the sleeve 70 is fitted, a hydraulic oil passage (the retard passage 55 and the advance passage 56) leading to the communication port, an annular receiving part 53 facing one end 70a of the sleeve 70 in the direction of the axis S, an opening 52 which is formed adjacent to the annular receiving part 53 and through which hydraulic oil flows, and an annular groove 59b adjacent to the other end 70b of the sleeve 70 in the direction of the axis S and recessed from the inner peripheral surface 51; a filter member 60 including an elastic part 63 sandwiched between the one end 70a of the sleeve 70 and the annular receiving part 53 of the passage member (fastening bolt 50) and exerting a biasing force in the direction of the axis S; and a snap ring 110 fitted in the annular groove 59b to receive the other end 70b of the sleeve 70 accommodated in the passage member (fastening bolt 50) and to detachably receive the spool 80.

Therefore, rattling of the sleeve 70 in the direction of the axis S within the fastening bolt 50 may be prevented. Therefore, the communication hole (the retard port 75 and the advance port 76) provided in the sleeve 70 may be positioned at a predetermined position with respect to the passage (the retard passage 55 and the advance passage 56) of the fastening bolt 50.

Accordingly, by moving the spool 80 by a preset movement amount, the opening and closing operation may be reliably performed, and the controllability of the spool 80 is improved.

Further, since the snap ring 110 is fitted into the annular groove 59b of the fastening bolt 50, the impact resistance in the direction of the axis S is enhanced, and the sleeve 70 may be reliably positioned and fixed at a predetermined position.

Further, the filter member 60 includes the elastic part 63. Specifically, the filter member 60 has a structure which includes the annular part 61, the filter part 62 provided inside the annular part 61, and the elastic part 63 provided on the annular part 61. Therefore, simply by sandwiching and assembling the filter member 60, which is a single component, between the annular receiving part 53 of the fastening bolt 50 and the one end 70a of the sleeve 70, a holding function that exerts an elastic biasing force, a filtering function, and a sealing function may be obtained. In this way, it is possible to simplify the structure, reduce the number of parts, simplify the assembly work, prevent foreign matter from entering, improve functional reliability, and the like.

In addition, since the elastic part 63 is provided on two end surfaces (end surfaces 61a and 61b) of the annular part 61 in the direction of the axis S, during assembly, the elastic part 63a provided on the end surface 61a may face the annular receiving part 53, or the elastic part 63b provided on the end surface 61b may face the annular receiving part 53; therefore, there is no directionality during assembly, and incorrect assembly may be prevented.

The elastic part 63 may employ a filter member in which the first elastic part 63a is provided only on the end surface 61a of the annular part 61 facing the annular receiving part 53 in the direction of the axis S. In this case, the end surface 61b of the annular part 61, which has high mechanical rigidity, directly abuts the one end 70a of the sleeve 70; therefore, the filter member may be securely held and fixed even if the shape of the receiving surface of the one end 70a is not annular but is partially notched.

In addition, the sleeve 70 includes the thinned passage 71a formed in the outer wall 71 for supplying the hydraulic oil that has passed through the filter member 60 to the inflow port (supply port 74), and the one end 70a of the sleeve 70 and the annular receiving part 53 of the passage member (fastening bolt 50) position and hold the filter member 60 in the region facing the thinned passage 71a; therefore, the diameter and size of the sleeve 70 and the passage member (fastening bolt 50) may be reduced by consolidating the passage.

Further, since the fluid control valve V includes the check valve 100 disposed inside the sleeve 70 to allow the inflow of hydraulic oil from the inlet (supply port 74), it is possible to achieve reduction in size and number of parts and the like compared with the configuration of the conventional example in which the check valve is provided outside the sleeve 70.

Further, the snap ring 110 includes a discharge port (the notch 110a and the circular holes 112a and 112b) through which the hydraulic oil flowing through the discharge passage (the first groove passage 71d, the second groove passage 71e, and the communication recess 71h) formed in the passage member (the fastening bolt 50) may be discharged; therefore, when the valve timing is changed in the valve timing changing device M, excess hydraulic oil may be discharged smoothly without remaining, and a desired changing operation may be achieved.

In addition, the snap ring 110 is formed in a flat plate shape extending in a direction perpendicular to the axis S; therefore, it may be made thinner in the direction of the axis S compared with bottomed cylinders, which contributes to miniaturization of the fluid control valve unit U.

Next, the operation of the valve timing changing device M will be described.

When the internal combustion engine is stopped, the vane rotor 20 is locked at an intermediate position with respect to the housing rotor 10 by the lock mechanism 40, as shown in FIG. 18.

In this way, the internal combustion engine may be started smoothly while preventing the flapping of the vane rotor 20 and the like. In addition, when the internal combustion engine is stopped, hydraulic oil is basically filled in the retard chamber RC by opening the first valve 82 at the rest position (a state in which communication between the first groove passage 71d and the through passage 71d₁ and the retard port 75 is blocked) and by the backflow prevention function of the check valve 100, except for the amount that leaks from the gaps.

Subsequently, when the internal combustion engine is started, the hydraulic oil supplied through the passages 1b and 1c, the opening 52, and the crevice passage $C_p$ defined by the thinned passage 71a opens the check valve 100, flows into the fluid control valve V from the supply port 74, and is supplied to the retard chamber RC from the retard port 75 or the advance chamber AC from the advance port 76, and then when the hydraulic pressure of the hydraulic oil guided to the lock mechanism 40 through the through passage 54 and the groove passage 27 reaches a releasing hydraulic pressure, the lock pin 41 is released from the lock hole 11d to release the lock. After the internal combustion engine is started, the position of the spool 80 of the fluid control valve V is appropriately controlled via the drive shaft 7a of the electromagnetic actuator 7, and phase control is performed so that the vane rotor 20 and the camshaft 1 are retarded, advanced, or held at a predetermined angular position.

First, the operation when the internal combustion engine is operating at low speed, for example, will be described. In this low-speed operation state, the hydraulic oil in the retard chamber RC and the advance chamber AC may reciprocate following torque fluctuations ($\Delta T$, $-\Delta T$) exerted by the camshaft 1.

Figure 21:
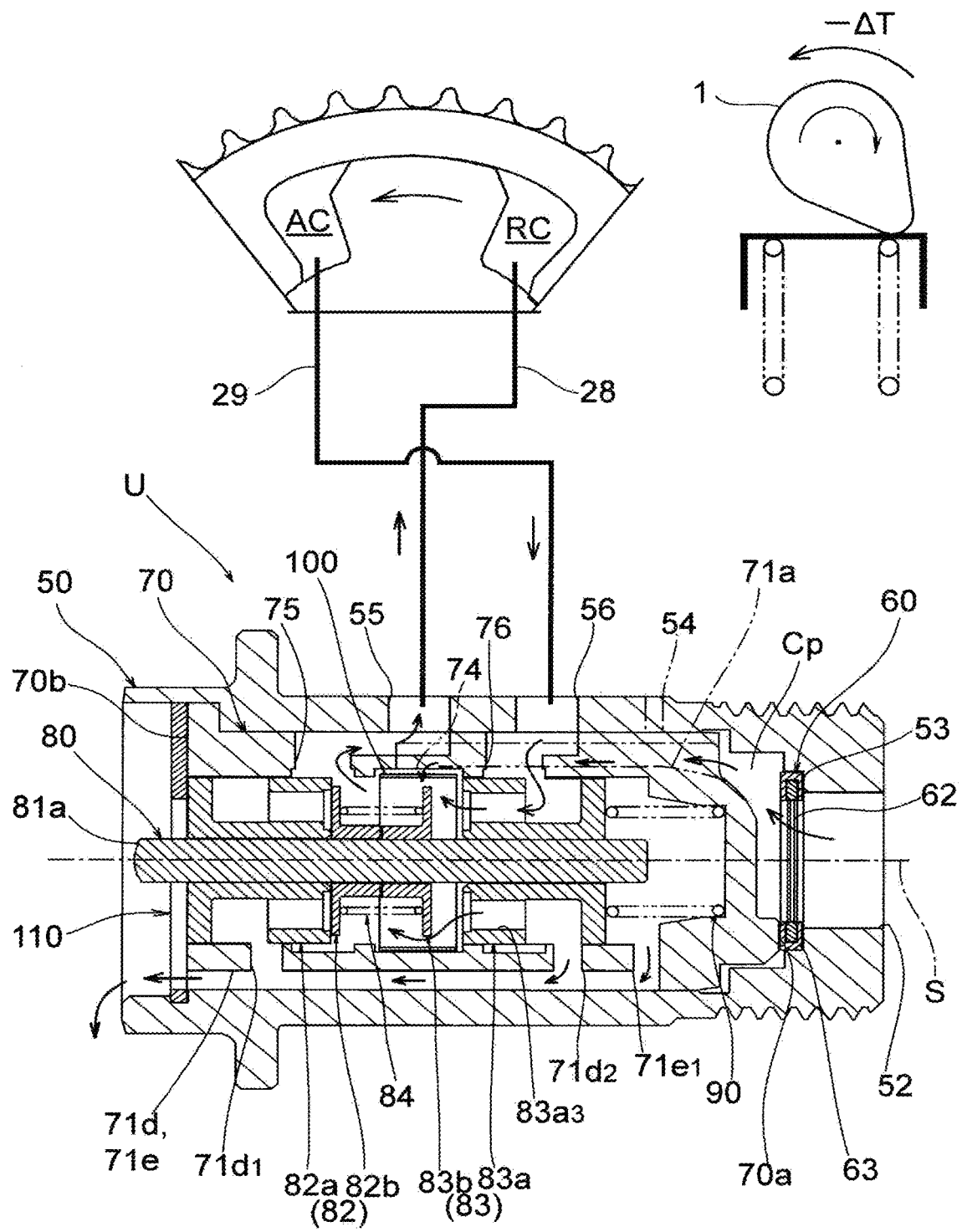
FIG. 21 is a schematic view showing the relationship between the spool of the fluid control valve and the flow of hydraulic oil in the retard port, the advance port, the retard chamber, and the advance chamber when the camshaft receives a reverse torque in the retard mode.
Figure 22:
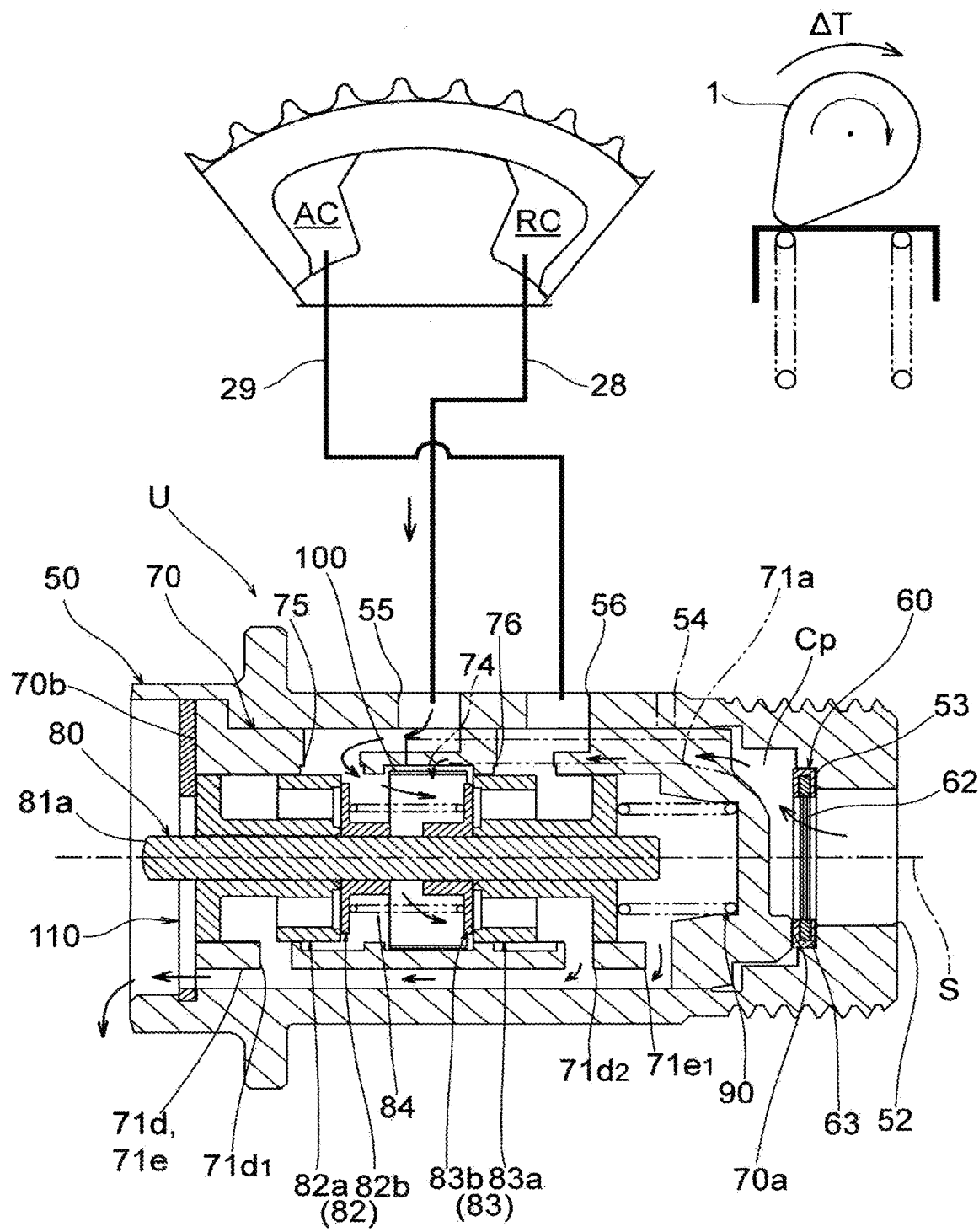
FIG. 22 is a schematic view showing the relationship between the spool of the fluid control valve and the flow of hydraulic oil in the retard port, the advance port, the retard chamber, and the advance chamber when the camshaft receives a forward torque in the retard mode.

For example, in the retard mode, the spool 80 is positioned at the rest position by the biasing force of the biasing spring 90, as shown in FIGS. 21 and 22.

In the retard mode, the first valve 82 is set to an open state in which the passage between the supply port 74 and the retard port 75 is opened, and the second valve 83 is in a closed state in which the passage between the supply port 74 and the advance port 76 is closed; specifically, a state is set in which the second land $83a_1$ of the second fixed part $83a$ opens the advance port 76, and the second lid part $83b_2$ of the second movable part $83b$ closes the second internal passage $83a_3$. Further, the discharge passage (the first groove passage 71d and the through passage $71d_2$) communicates with the advance port 76 and is in a state in which the hydraulic oil in the advance chamber AC may be discharged.

In this state, when the camshaft 1 receives a reverse torque ($-\Delta T$) in a direction opposite to the forward rotation direction CR, the oil pressure of the hydraulic oil in the advance chamber AC increases. Therefore, as shown in FIG. 21, the hydraulic oil in the advance chamber AC resists the biasing force of the compression spring 84 and separates the second lid part $83b_2$ of the second movable part $83b$ from the second fixed part $83a$. In this way, the second internal passage $83a_3$ is opened, and hydraulic oil actively flows from the advance port 76 to the retard port 75. At this time, a smaller amount of hydraulic oil than the hydraulic oil flowing to the retard port 75 passes through the discharge passage (the through passage $71d_2$ and the first groove passage 71d, and the communication recess 71h) and is discharged from the discharge port of the snap ring 110 (the notch 110a and the circular hole 112a). In addition, the hydraulic oil that has leaked into the region where the biasing spring 90 is disposed passes through the discharge passage (the through passage $71e_1$ and the second groove passage 71e, and the communication recess 71h) as appropriate, and is discharged from the discharge port of the snap ring 110 (the notch 110a and the circular hole 112b).

In addition, when the camshaft 1 receives a forward torque ($\Delta T$), the oil pressure of the hydraulic oil in the retard chamber RC increases. However, as shown in FIG. 22, since the hydraulic oil in the retard chamber RC acts in a direction to bring the second movable part $83b$ into contact with the second fixed part $83a$, the second internal passage $83a_3$ is closed, and hydraulic oil does not flow from the retard port 75 to the advance port 76.

By continuously receiving the reverse torque ($-\Delta T$) and the forward torque ($\Delta T$), the hydraulic oil in the advance chamber AC moves into the retard chamber RC, and the vane rotor 20 is positioned at the most retarded position shown in FIG. 19. During this process, the check valve 100 is appropriately opened to allow the inflow of hydraulic oil from the supply port 74 in order to replenish the hydraulic oil.

Figure 23:
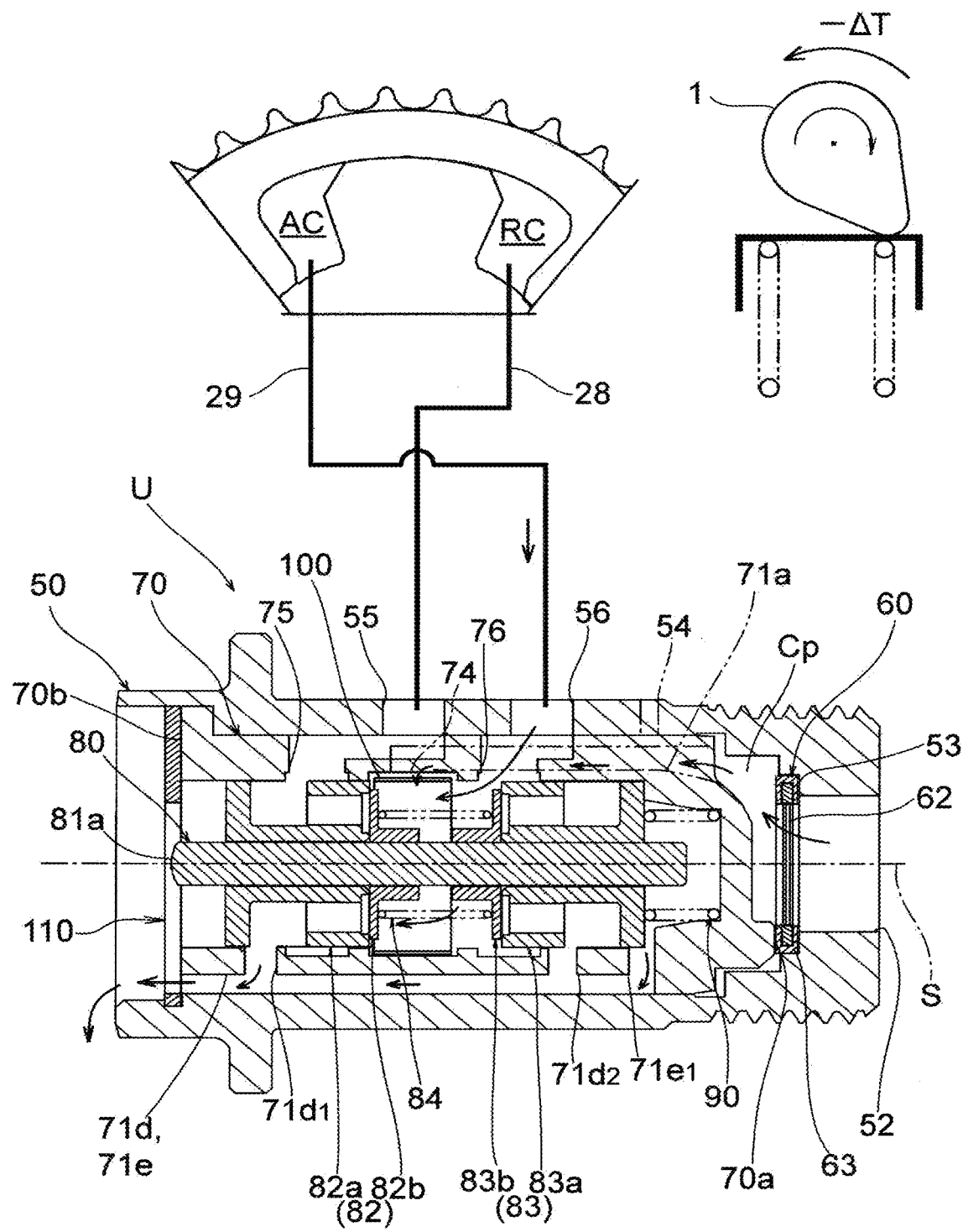
FIG. 23 is a schematic view showing the relationship between the spool of the fluid control valve and the flow of hydraulic oil in the retard port, the advance port, the retard chamber, and the advance chamber when the camshaft receives a reverse torque in the advance mode.
Figure 24:
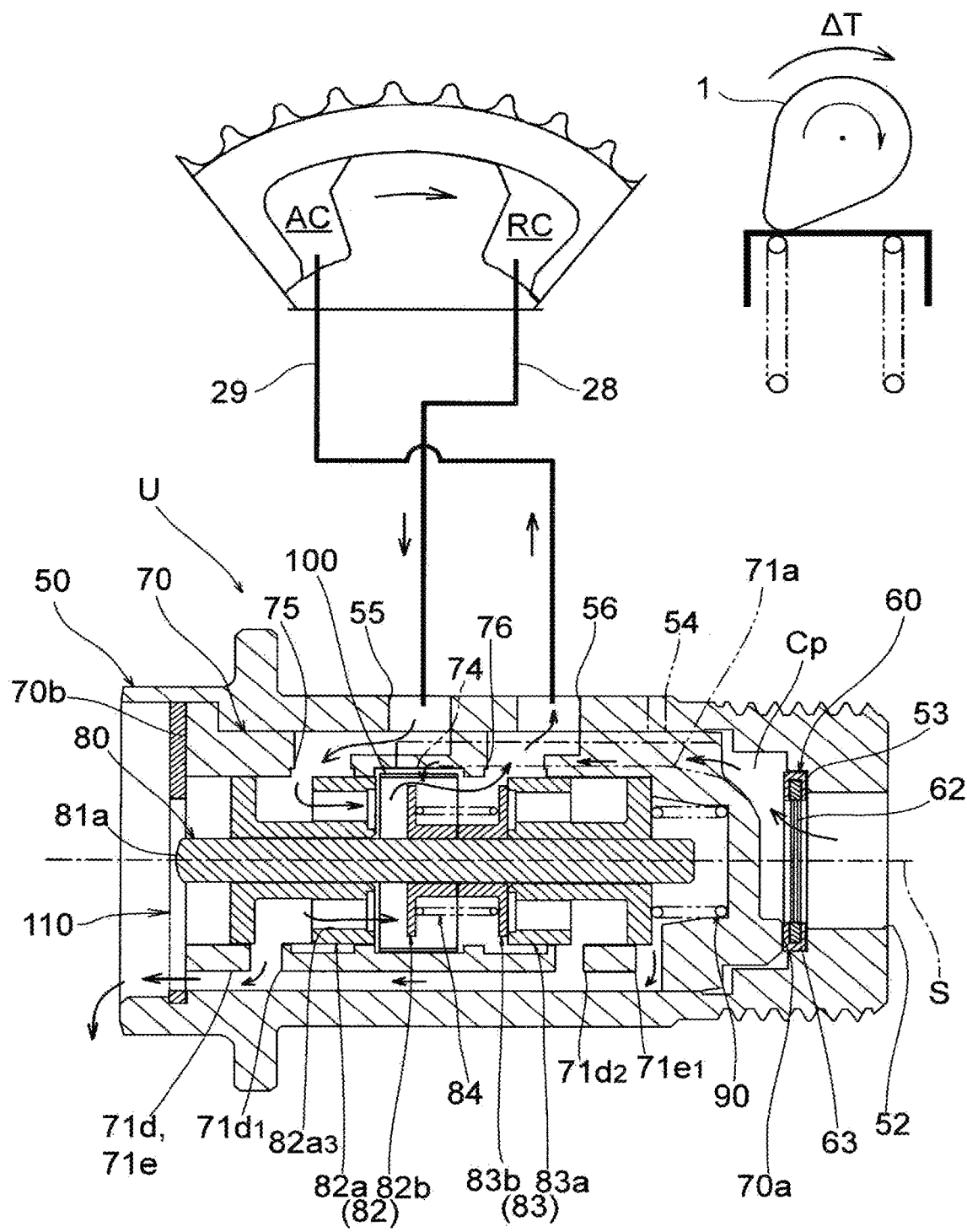
FIG. 24 is a schematic view showing the relationship between the spool of the fluid control valve and the flow of hydraulic oil in the retard port, the advance port, the retard chamber, and the advance chamber when the camshaft receives a forward torque in the advance mode.

Next, in the advance mode, as shown in FIGS. 23 and 24, the spool 80 is positioned at the deepest position in the direction of the axis S by the drive shaft 7a of the electromagnetic actuator 7 against the biasing force of the biasing spring 90.

In the advance mode, the second valve 83 is set to an open state in which the passage between the supply port 74 and the advance port 76 is opened, and the first valve 82 is in a closed state in which the passage between the supply port 74 and the retard port 75 is closed; specifically, a state is set in which the first land $82a_1$ of the first fixed part $82a$ opens the retard port 75, and the first lid part $82b_2$ of the first movable part $82b$ closes the first internal passage $82a_3$. Further, the discharge passage (the groove passage 71d and the through passage $71d_1$) communicates with the retard port 75 and is in a state in which the hydraulic oil in the retard chamber RC may be discharged.

In this state, when the camshaft 1 receives a reverse torque (−ΔT) in a direction opposite to the forward rotation direction CR, the oil pressure of the hydraulic oil in the advance chamber AC increases. However, as shown in FIG. 23, since the hydraulic oil in the advance chamber AC acts in a direction to bring the first movable part 82b into contact with the first fixed part 82a, the first internal passage $82a_3$ is closed, and hydraulic oil does not flow from the advance port 76 to the retard port 75.

In addition, when the camshaft 1 receives a forward torque (ΔT), the oil pressure of the hydraulic oil in the retard chamber RC increases. Therefore, as shown in FIG. 24, the hydraulic oil in the retard chamber RC resists the biasing force of the compression spring 84 and separates the first lid part $82b_2$ of the first movable part 82b from the first fixed part 82a. In this way, the first internal passage $82a_3$ is opened, and hydraulic oil actively flows from the retard port 75 to the advance port 76. At this time, a smaller amount of hydraulic oil than the hydraulic oil flowing to the advance port 76 passes through the discharge passage (the through passage $71d_1$ and the first groove passage 71d, and the communication recess 71h) and is discharged from the discharge port of the snap ring 110 (the notch 110a and the circular hole 112a). In addition, the hydraulic oil that has leaked into the region where the biasing spring 90 is disposed passes through the discharge passage (the through passage $71e_1$ and the second groove passage 71e, and the communication recess 71h) as appropriate, and is discharged from the discharge port of the snap ring 110 (the notch 110a and the circular hole 112b).

By continuously receiving the reverse torque (−ΔT) and the forward torque (ΔT), the hydraulic oil in the retard chamber RC moves into the advance chamber AC, and the vane rotor 20 is positioned at the most advanced position shown in FIG. 20. During this process, the check valve 100 is appropriately opened to allow the inflow of hydraulic oil from the supply port 74 in order to replenish the hydraulic oil.

That is, in the state where the spool 80 of the fluid control valve V is positioned in the retard mode in which the first valve 82 is opened and the second valve 83 is closed, when the camshaft 1 receives a reverse torque (−ΔT), the second valve 83 opens to allow hydraulic oil to flow from the advance port 76 to the retard port 75; in the state where the spool 80 is positioned in the advance mode in which the first valve 82 is closed and the second valve 83 is opened, when the camshaft 1 receives a forward torque (ΔT), the first valve 82 opens to allow hydraulic oil to flow from the retard port 75 to the advance port 76.

The above series of operations are operations when the internal combustion engine is in a low speed operation state, for example; when the internal combustion engine is operating at high speed, for example, the torque fluctuation (ΔT, −ΔT) exerted by the camshaft 1 is small, and reciprocating movement of hydraulic oil in the retard chamber RC and the advance chamber AC does not occur, and the opening and closing operations of the first valve 82 and the second valve 83 due to torque fluctuations are difficult to perform.

As a result, the valve opening of the check valve 100 causes the hydraulic oil supplied from the supply port 74 to actively flow into the retard chamber RC or the advance chamber AC, and hydraulic oil in the advance chamber AC or the retard chamber RC passes through the discharge passage (the through passage $71d_2$ or the through passage $71d_1$ and first groove passage 71d) and is actively discharged to the outside from the discharge port of the snap ring 110 (the notch 110a and the circular hole 112a). In addition, the hydraulic oil that has leaked into the region where the biasing spring 90 is disposed passes through the discharge passage (the through passage $71e_1$ and the second groove passage 71e, and the communication recess 71h) as appropriate, and is discharged from the discharge port of the snap ring 110 (the notch 110a and the circular hole 112b).

Figure 25:
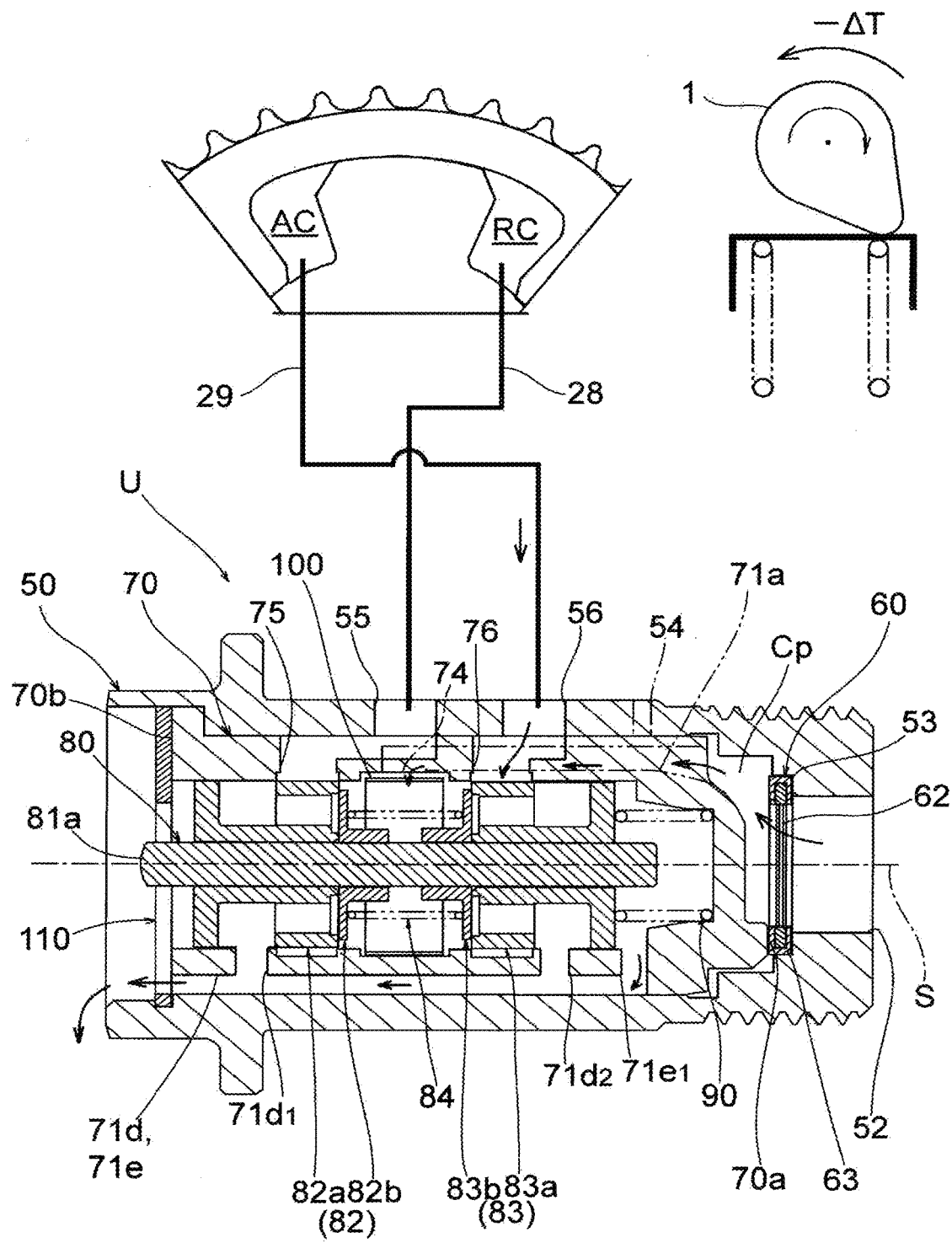
FIG. 25 is a schematic view showing the relationship between the spool of the fluid control valve and the flow of hydraulic oil in the retard port, the advance port, the retard chamber, and the advance chamber when the camshaft receives a reverse torque in the neutral holding mode.
Figure 26:
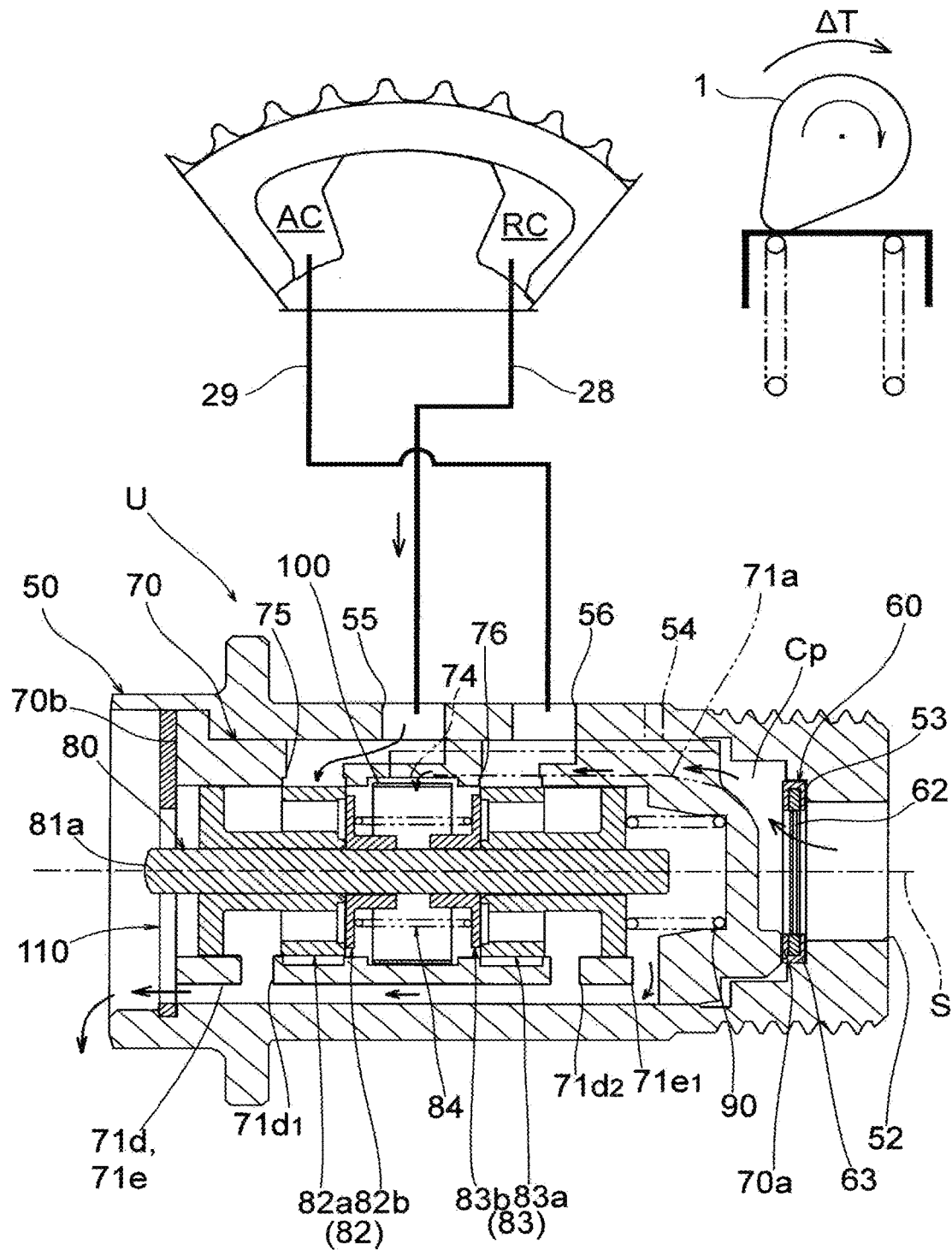
FIG. 26 is a schematic view showing the relationship between the spool of the fluid control valve and the flow of hydraulic oil in the retard port, the advance port, the retard chamber, and the advance chamber when the camshaft receives a forward torque in the neutral holding mode.

Next, in the neutral holding mode, as shown in FIGS. 25 and 26, the spool 80 is positioned at the intermediate position in the direction of the axis S by the drive shaft 7a of the electromagnetic actuator 7 against the biasing force of the biasing spring 90.

In the neutral holding mode, the first valve 82 is set to a closed state in which the passage between the supply port 74 and the retard port 75 is closed, and the second valve 83 is set to a closed state in which the passage between the supply port 74 and the advance port 76 is closed.

Specifically, the first valve 82 is set to a state in which the first land $82a_1$ of the first fixed part 82a closes the retard port 75, and the first lid part $81b_2$ of the first movable part 82b closes the first internal passage $82a_3$. Further, the second valve 83 is set to a state in which the second land $83a_1$ of the second fixed part 83a closes the advance port 76, and the second lid part $83b_2$ of the second movable part 83b closes the second internal passage $83a_3$. Further, communication between the discharge passage (the groove passage 71d and the through passage $71d_1$) and the retard port 75 is blocked, and communication between the discharge passage (the groove passage 71d and the through passage $71d_2$) and the advance port 76 is blocked.

In this state, when the camshaft 1 receives a reverse torque (−ΔT) in a direction opposite to the forward rotation direction CR, the oil pressure of the hydraulic oil in the advance chamber AC increases. However, since the advance port 76 is closed by the second land $83a_1$ of the second valve 83 as shown in FIG. 25, the hydraulic oil in the advance chamber AC cannot move from the advance port 76 to the retard port 75 and stays in the advance chamber AC.

In addition, when the camshaft 1 receives a forward torque (ΔT), the oil pressure of the hydraulic oil in the retard chamber RC increases. However, since the retard port 75 is closed by the first land $82a_1$ of the first valve 82 as shown in FIG. 26, the hydraulic oil in the retard chamber RC cannot move from the retard port 75 to the advance port 76 and stays in the retard chamber RC.

As described above, in the neutral holding mode, the reciprocation of hydraulic oil between the retard chamber RC and the advance chamber AC is blocked, and the discharge passage (the through passages $71d_1$ and $71d_2$) is also closed; therefore, the vane rotor 20 is held at a desired intermediate position with respect to the housing rotor 10 between the most retarded position and the most advanced position.

That is, in the fluid control valve V, the spool 80 is formed to block the reciprocation of hydraulic oil between the retard chamber RC and the advance chamber AC in the state of being positioned in the neutral holding mode in which the first valve 82 closes the retard port 75 and the second valve 83 closes the advance port 76.

As described above, the fluid control valve V is a torque-driven and hydraulically-driven fluid control valve capable of reciprocating hydraulic oil between the retard chamber RC and the advance chamber AC by the fluctuating torque received by the camshaft 1 and capable of discharging a part of the supplied hydraulic oil; therefore, the hydraulic oil may be caused to reciprocate between the retard chamber RC and the advance chamber AC in an operating state where a sufficient fluctuating torque is obtained (for example, during low-speed operation), and the hydraulic oil may be discharged actively to change the opening/closing timing of the valve to the desired timing in an operating state where it is difficult to obtain a sufficient fluctuating torque (for example, during high-speed operation).

FIGS. 27 to 30 show a fluid control valve unit U according to another embodiment, which is the same as the previous embodiment except that the above-described fastening bolt 50, sleeve 70 and filter member 60 are changed, and a fastening bolt 150, a sleeve 170 and a filter member 160 are adopted. Therefore, the same reference numerals are assigned to the same configurations as in the above-described embodiment, and the description thereof is omitted.

The fluid control valve unit U according to this embodiment includes a fastening bolt 150 as a passage member, a filter member 160, a fluid control valve V disposed in the fastening bolt 150, and a snap ring 110.

The fluid control valve V switches passages to control the flow of hydraulic oil, and includes a sleeve 170, a spool 80, a biasing spring 90, and a check valve 100.

The fastening bolt 150 includes a cylindrical part 50a, an inner peripheral surface 51, an opening 52, an annular receiving part 153, a through passage 54, a retard passage 55, an advance passage 56, a flanged head 57, a male screw part 58, a positioning recess 59a, and an annular groove 59b.

The annular receiving part 153 is formed as a flat surface perpendicular to the axis S to face one end 170a of the sleeve 170 inside the opening 52 in the direction of the axis S, and is formed to receive an elastic part of the filter member 160.

The filter member 160 includes an annular part 161, a filter part 162 and an elastic part 163.

The annular part 161 is formed in an annular shape centered on the axis S using a metal material or a resin material with high bending rigidity and sufficient mechanical strength, and defines end surfaces 161a and 161b as two end surfaces that are flat in the direction of the axis S and an inner edge recess 161c on the side of the end surface 161a.

The filter part 162 is formed of a metal mesh (punch metal), and is fitted and coupled to the inner edge recess 161c of the annular part 161. In addition, the filter part 162 may be molded integrally with the annular part 161.

The elastic part 163 is formed in an annular shape using a rubber material such as acrylic rubber, and is provided on the end surface 161a of the annular part 161.

Here, the elastic part 163 exerts a biasing force on the sleeve 170 in the direction of the axis S, and performs a sealing function to prevents hydraulic oil from leaking and foreign matter from entering between the contact surface of the annular receiving part 153 and the elastic part 163. The elastic part 163 may be molded integrally with the annular part 161 and the filter part 162 or may be adhered to the annular part 161.

When the filter member 160 is assembled as the fluid control valve unit U, the filter member 60 is sandwiched between the one end 170a of the sleeve 170 and the annular receiving part 153 of the fastening bolt 150, and it is positioned particularly in a region where the region of the filter part 162 faces the thinned passage 71a of the sleeve 170, and the elastic part 163 exerts a biasing force in the direction of the axis S.

The sleeve 170 is formed in a bottomed cylindrical shape that defines the axis S using aluminum or other metal material, and includes one end 170a and the other end 70b forming two ends in the direction of the axis S, an outer wall 71, thinned passages 71a, 71b and 71c, a first groove passage 71d, through passages $71d_1$ and $71d_2$, a second groove passage 71e, a through passage $71e_1$, a fitting hole 71f, a fitting pin 71g, a communication recess 71h, an inner peripheral surface 72, annular grooves 72a, 72b and 72c, an opening 73, a supply port 74, a retard port 75, an advance port 76, a stopper wall 77, a spring receiving part 78 and a positioning protrusion 79.

Figure 27:
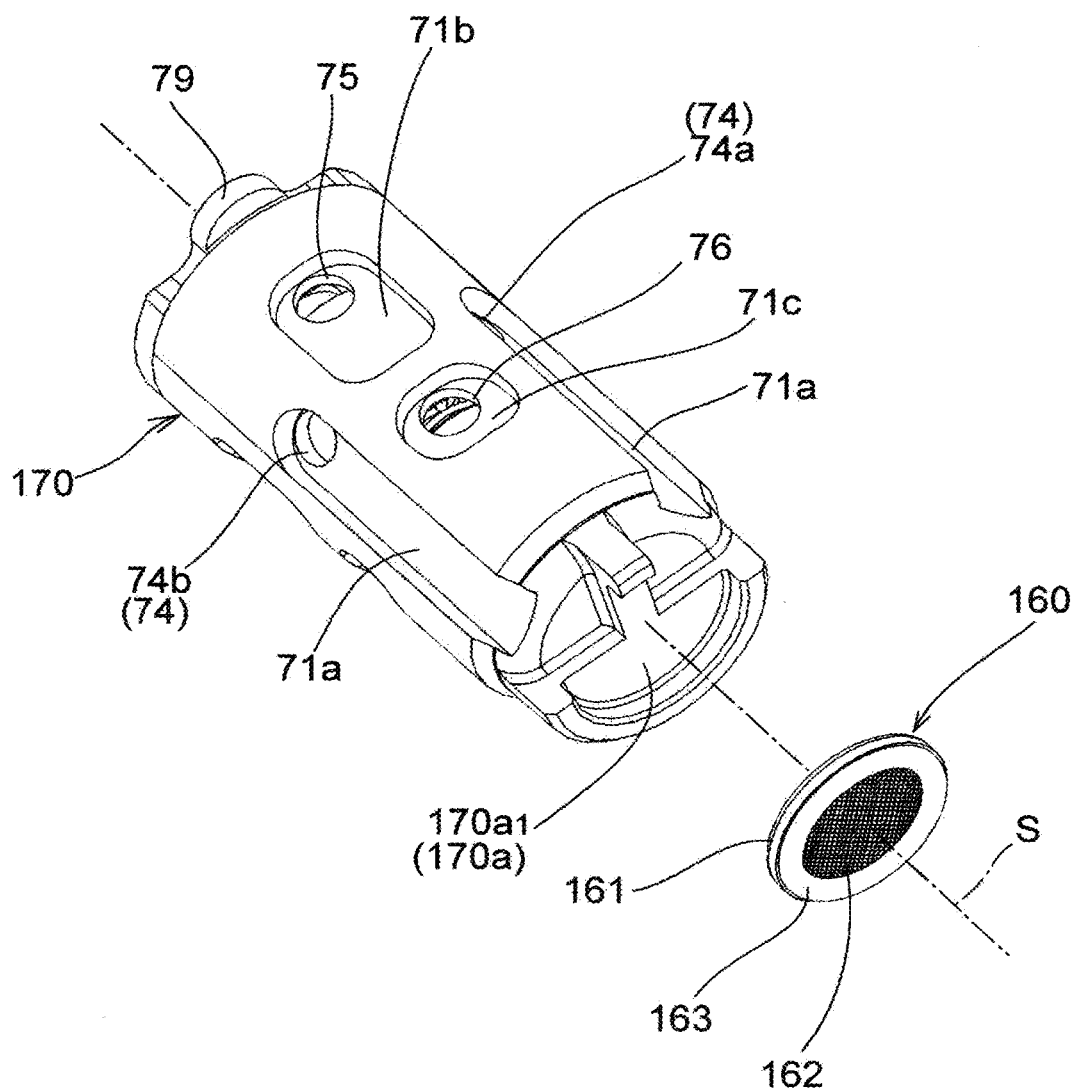
FIG. 27 shows another embodiment of the fluid control valve unit of the disclosure, and is an exploded perspective view of a sleeve and a filter member forming a part of the fluid control valve unit.
Figure 28:
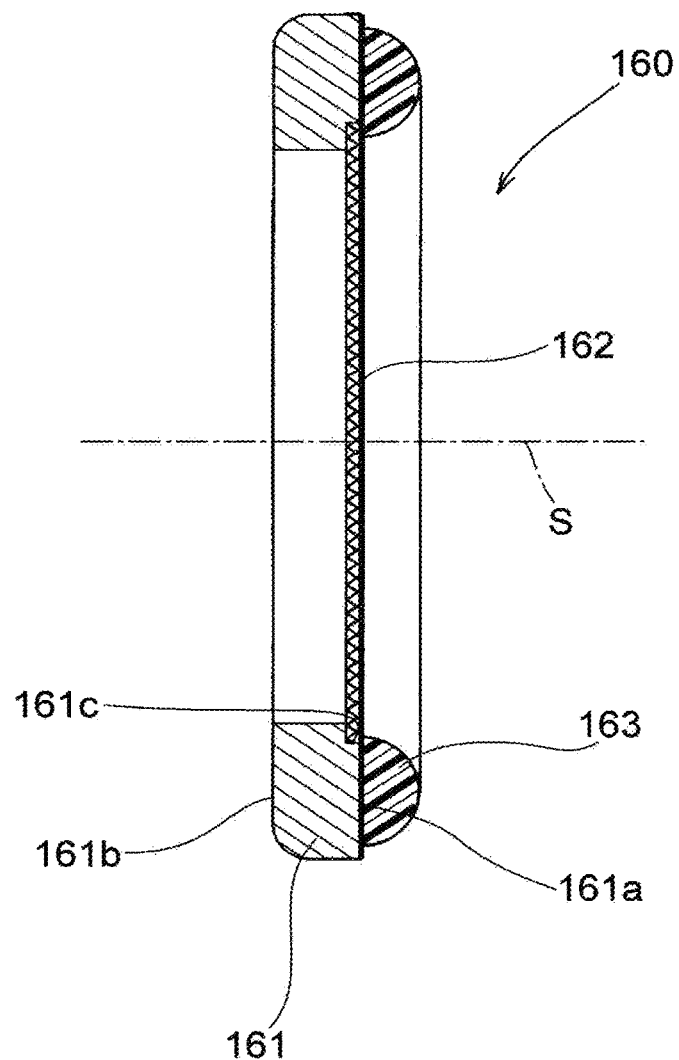
FIG. 28 shows the filter member shown in FIG. 27, and is a cross-sectional view taken along a plane including the axis.
Figure 29:
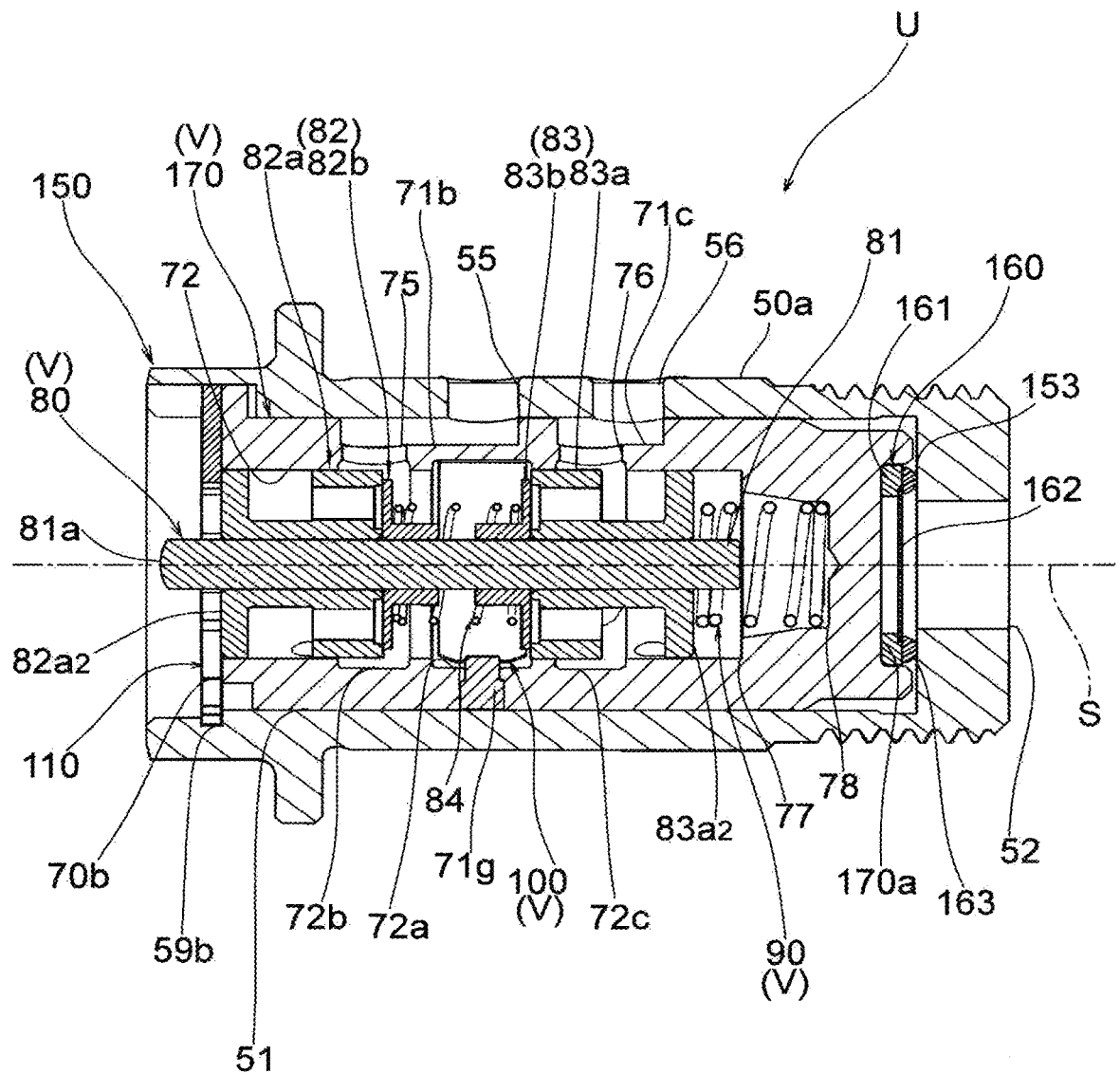
FIG. 29 is a cross-sectional view of the fluid control valve unit shown in FIG. 27 in a region away from the thinned passage.
Figure 30:
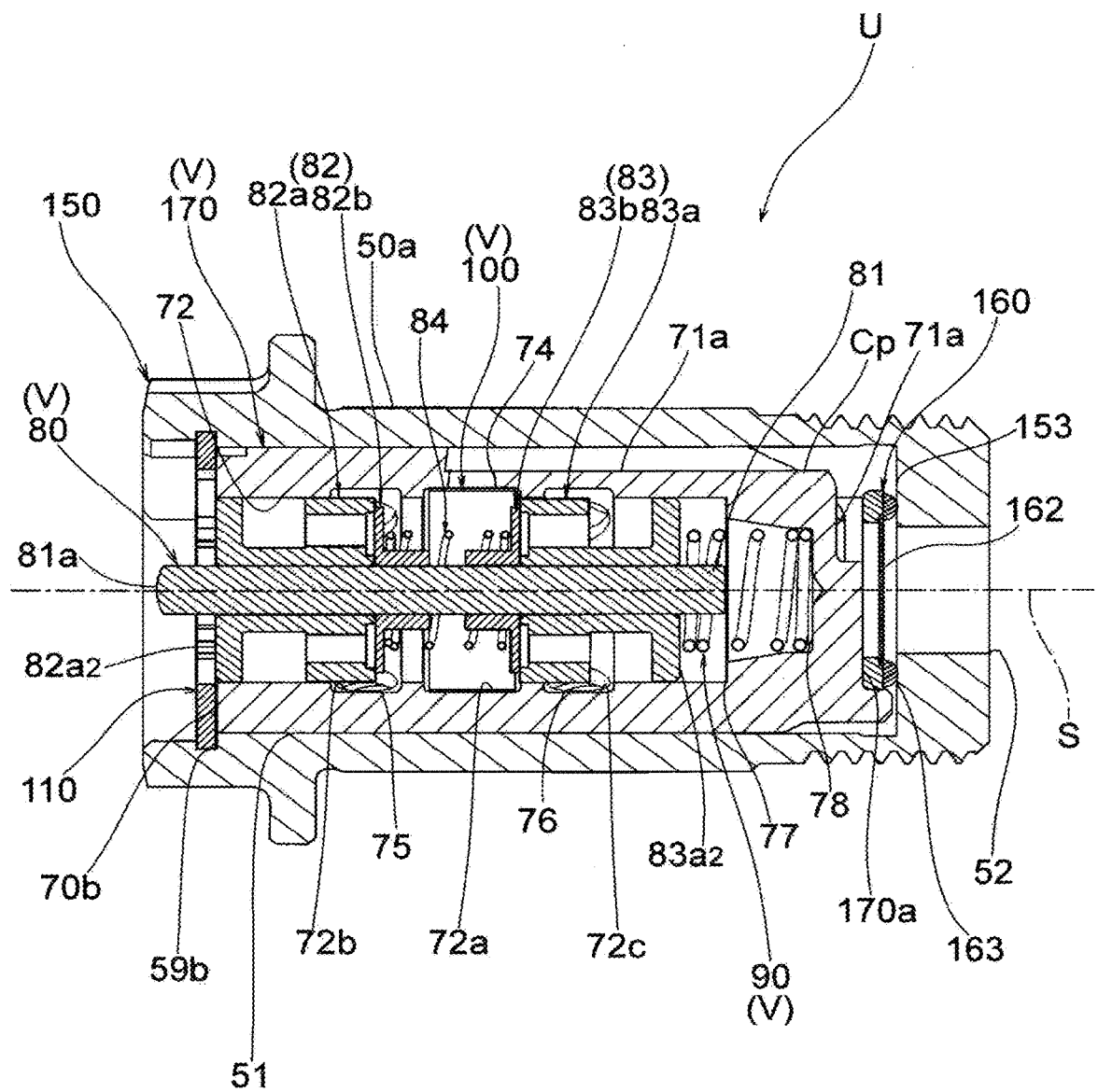
FIG. 30 is a cross-sectional view of the fluid control valve unit shown in FIG. 27 in a region including the thinned passage.

As shown in FIG. 27, the one end 170a is hollowed to communicate with the thinned passage 71a at two points in an annular recess centered on the axis S, defines a flat surface $170a_1$ perpendicular to the axis S, and is formed to abut on an end surface 161b of the annular part 161 of the filter member 160.

The one end 170a is received by the annular receiving part 153 of the fastening bolt 150 with the filter member 160 interposed therebetween in the assembled state, and positions the center of the filter member 160 on the axis S.

The fluid control valve unit U according to this embodiment includes a filter member 160 including an elastic part 163 sandwiched between the one end 170a of the sleeve 170 and the annular receiving part 153 of the passage member (fastening bolt 150) and exerting a biasing force in the direction of the axis S, and a snap ring 110 fitted in the annular groove 59b to receive the other end 70b of the sleeve 170 accommodated in the passage member (fastening bolt 50) and to detachably receive the spool 80. Therefore, rattling of the sleeve 170 in the direction of the axis S within the fastening bolt 150 may be prevented.

Therefore, the communication hole (the retard port 75 and the advance port 76) provided in the sleeve 170 may be positioned at a predetermined position with respect to the passage (the retard passage 55 and the advance passage 56) of the fastening bolt 150. Accordingly, by moving the spool 80 by a preset movement amount, the opening and closing operation may be reliably performed, and the controllability of the spool 80 is improved.

Further, since the snap ring 110 is fitted into the annular groove 59b of the fastening bolt 150, the impact resistance in the direction of the axis S is enhanced, and the sleeve 170 may be reliably positioned and fixed at a predetermined position.

Further, the filter member 160 includes the elastic part 163. Specifically, the filter member 160 has a structure which includes the annular part 161, the filter part 162 provided inside the annular part 161, and the elastic part 163 provided on the annular part 161. Therefore, simply by sandwiching and assembling the filter member 160, which is a single component, between the annular receiving part 153 of the fastening bolt 150 and the one end 170a of the sleeve 170, a holding function that exerts an elastic biasing force, a filtering function, and a sealing function may be obtained. In this way, it is possible to simplify the structure, reduce the number of parts, simplify the assembly work, prevent foreign matter from entering, improve functional reliability, and the like.

In this embodiment, the filter member 160 adopts a configuration in which the elastic part 163 is provided on the end surface 161a on one side of the annular part 161, but the disclosure is not limited thereto. An elastic part may also be provided on the other end surface 161b of the annular part 161 to abut on the flat surface $170a_1$ of the one end 170a of the sleeve 170.

As described above, according to the fluid control valve unit U according to the above embodiment, it is possible to simplify the structure, reduce the number of parts, and simplify the assembly work, and it is possible to prevent foreign matter from entering and to hold the sleeves 70 and 170 at predetermined positions to ensure functional reliability. Further, according to the valve timing changing device M including the fluid control valve unit U with the above configurations, it is possible to hold the sleeves 70 and 170 at predetermined positions to ensure functional reliability while achieving miniaturization of the device and the like, to improve the controllability of the spool 80, and to achieve a desired operation.

In the above-described embodiments, the filter members 60 and 160 in which the elastic parts 63 and 163 made of rubber material are integrally formed (molded or adhered) to the annular parts 61 and 161 are shown as the filter members, but the disclosure is not limited thereto. Instead, the annular part and the filter part and the elastic part may be formed as separate parts; for example, the elastic part may be formed as an O-ring, and the O-ring may be superimposed on two end surfaces or on one end surface of the annular part.

Further, the elastic part is not limited to a rubber material, and other materials may be used as long as they generate an elastic biasing force in the direction of the axis S and exhibit sealing performance.

In the above embodiments, the one ends 70a and 170a, which are partially notched in an annular shape centered on the axis S, are shown as the ends of the sleeve, but the disclosure is not limited thereto. It is also possible to employ one end that defines an annular receiving surface and is formed such that the inner side of the receiving surface is partially open and communicates with the thinned passage 71a, as long as it is possible to remove the mold in the direction of the axis S and in the direction perpendicular to the axis S when the sleeve is molded.

In the above embodiments, the lock mechanism 40 locks in the intermediate position, but the disclosure is not limited thereto, and the lock mechanism 40 may be in the most retarded position or any position.

In the above embodiments, the rotation biasing spring 30 exerting a biasing force in the advancing direction is shown as the rotation biasing spring for rotationally biasing the vane rotor 20, but the disclosure is not limited thereto, and a rotation biasing spring that exerts a biasing force in the retarding direction may be adopted instead.

In the above embodiments, the fluid control valve V that is torque-driven and hydraulically-driven is shown as the fluid control valve, but the disclosure is not limited thereto. Other forms of fluid control valves may be adopted as long as they may supply and discharge hydraulic oil.

In the above embodiments, the fluid control valve unit U in which the fluid control valve V is disposed inside the fastening bolt 50, 150 as the passage member is shown as the fluid control valve unit, but the disclosure is not limited thereto, and the disclosure may also be applied to a configuration in which the fluid control valve V is disposed in another passage member or in the cylinder block of the engine.

In the above embodiments, hydraulic oil is shown as the fluid controlled by the fluid control valve unit, but the disclosure is not limited thereto, and the fluid control valve unit may be applied in controlling the flow of other fluids.

As described above, the fluid control valve unit of the disclosure may simplify the structure, reduce the number of parts, and simplify the assembly work, and it may prevent foreign matter from entering and hold the sleeve at the predetermined position to ensure functional reliability. Therefore, it may be applied not only to internal combustion engines mounted on automobiles and the like, but also to internal combustion engines mounted on motorcycles and the like, and other machines or devices for controlling the flow of fluid.

What is claimed is:

1. A fluid control valve unit comprising:
   a fluid control valve comprising a sleeve in a bottomed cylindrical shape that defines an axis and has an inlet for fluid and a communication port communicating with outside for fluid to pass through, and a spool slidably disposed in the sleeve for opening and closing the communication port;
   a cylindrical passage member comprising an inner peripheral surface to which the sleeve is fitted, a passage for fluid leading to the communication port, an annular receiving part facing one end of the sleeve in a direction of the axis, an opening formed adjacent to the annular receiving part and allowing fluid to flow in, and an annular groove formed adjacent to an other end of the sleeve in the direction of the axis and recessed from the inner peripheral surface;
   a filter member comprising an elastic part sandwiched between the one end of the sleeve and the annular receiving part of the passage member and exerting a biasing force in the direction of the axis, the filter member is disposed at a location facing the annular receiving part of the passage member and the one end of the sleeve in the direction of the axis; and
   a snap ring fitted in the annular groove for receiving the other end of the sleeve accommodated in the passage member and detachably receiving the spool,
   wherein the sleeve is disposed such that one end of the sleeve abuts the elastic part of the filter member, and an other end of the sleeve abuts the snap ring,
   wherein the sleeve comprises a thinned passage formed in an outer wall for supplying fluid that has passed through the filter member to the inlet, and
   the one end of the sleeve and the annular receiving part of the passage member position and hold the filter member in a region facing the thinned passage.

2. The fluid control valve unit according to claim 1, wherein the filter member comprises an annular part facing the annular receiving part of the passage member and the one end of the sleeve in the direction of the axis, a filter part provided inside the annular part, and the elastic part provided on the annular part.

3. The fluid control valve unit according to claim 2, wherein the elastic part is provided on two end surfaces of the annular part in the direction of the axis.

4. The fluid control valve unit according to claim 2, wherein the elastic part is provided on an end surface of the annular part facing the annular receiving part of the passage member in the direction of the axis.

5. The fluid control valve unit according to claim 2, wherein the elastic part is provided on two end surfaces of the annular part in the direction of the axis.

6. The fluid control valve unit according to claim 2, wherein the elastic part is provided on an end surface of the annular part facing the annular receiving part of the passage member in the direction of the axis.

7. The fluid control valve unit according to claim 1, wherein the fluid control valve comprises a check valve disposed inside the sleeve to allow fluid to flow in from the inlet.

8. The fluid control valve unit according to claim 1, wherein the snap ring comprises a discharge port capable of discharging fluid flowing through a discharge passage formed in the passage member.

9. The fluid control valve unit according to claim 8, wherein the snap ring is formed in a flat plate shape extending in a direction perpendicular to the axis.

10. A fluid control valve unit comprising:
- a fluid control valve comprising a sleeve in a bottomed cylindrical shape that defines an axis and has an inlet for fluid and a communication port communicating with outside for fluid to pass through, and a spool slidably disposed in the sleeve for opening and closing the communication port;
- a cylindrical passage member comprising an inner peripheral surface to which the sleeve is fitted, a passage for fluid leading to the communication port, an annular receiving part facing one end of the sleeve in a direction of the axis, an opening formed adjacent to the annular receiving part and allowing fluid to flow in, and an annular groove formed adjacent to an other end of the sleeve in the direction of the axis and recessed from the inner peripheral surface;
- a filter member comprising an elastic part sandwiched between the one end of the sleeve and the annular receiving part of the passage member and exerting a biasing force in the direction of the axis; and
- a snap ring fitted in the annular groove for receiving the other end of the sleeve accommodated in the passage member and detachably receiving the spool,
- wherein the sleeve is disposed such that one end of the sleeve abuts the elastic part of the filter member, and an other end of the sleeve abuts the snap ring,
- wherein the sleeve comprises, as the communication port, a first communication port and a second communication port located on two sides of the inlet in the direction of the axis, and
- the spool comprises a rod that reciprocates within the sleeve, a first valve that is provided on the rod to open and close a passage between the inlet and the first communication port, a second valve that is provided on the rod to open and close a passage between the inlet and the second communication port, and a biasing spring that exerts a biasing force in a direction to bring the first valve into contact with the snap ring.

11. The fluid control valve unit according to claim 10, wherein the spool comprises a compression spring disposed between the first valve and the second valve,
the first valve comprises:
- a first fixed part fixed to the rod and having a first land capable of closing the first communication port and a first internal passage formed inside the first land; and
- a first movable part movably supported along the rod and having a first lid part for opening and closing the first internal passage, the second valve comprises:
- a second fixed part fixed to the rod and having a second land capable of closing the second communication port and a second internal passage formed inside the second land; and
- a second movable part movably supported along the rod and having a second lid part for opening and closing the second internal passage, and
- the compression spring is disposed to exert a biasing force to close the first lid part and to close the second lid part.

12. A valve timing changing device for changing opening and closing timing of an intake valve or an exhaust valve driven by a camshaft, the valve timing changing device comprising:
- a housing rotor that rotates coaxially with the camshaft;
- a vane rotor that defines an advance chamber and a retard chamber together with the housing rotor and that rotates integrally with the camshaft; and
- the fluid control valve unit according to claim 11 for controlling supply and discharge of hydraulic oil with respect to the advance chamber and the retard chamber,
- wherein the inlet of the fluid control valve unit is a supply port to which hydraulic oil is supplied,
- the first communication port of the fluid control valve unit is a retard port that communicates with the retard chamber, and
- the second communication port of the fluid control valve unit is an advance port that communicates with the advance chamber.

13. The valve timing changing device according to claim 12, further comprising a fastening bolt that fastens the vane rotor to the camshaft,
wherein the fastening bolt is the passage member of the fluid control valve unit.

14. The valve timing changing device according to claim 13, wherein the fluid control valve of the fluid control valve unit is a torque-driven and hydraulically-driven fluid control valve capable of reciprocating hydraulic oil between the retard chamber and the advance chamber by a fluctuating torque received by the camshaft and discharging a part of the supplied hydraulic oil.

15. The valve timing changing device according to claim 14, wherein the spool is formed so that in a state where the spool is positioned in a retard mode in which the first valve is opened and the second valve is closed, when the camshaft receives a reverse torque, the second valve opens to allow hydraulic oil to flow from the advance port to the retard port, and
in a state where the spool is positioned in an advance mode in which the first valve is closed and the second valve is opened, when the camshaft receives a forward torque, the first valve opens to allow hydraulic oil to flow from the retard port to the advance port.

16. The valve timing changing device according to claim 15, wherein the spool is formed to block reciprocation of hydraulic oil between the retard chamber and the advance chamber in a state of being positioned in a neutral holding mode in which the first valve closes the retard port and the second valve closes the advance port.

* * * * *